(12) United States Patent
Otsuka et al.

(10) Patent No.: US 10,196,091 B2
(45) Date of Patent: Feb. 5, 2019

(54) AUTOMOBILE MEMBER

(71) Applicant: NIPPON STEEL & SUMITOMO METAL CORPORATION, Tokyo (JP)

(72) Inventors: Kenichiro Otsuka, Tokai (JP); Yoshiaki Nakazawa, Takarazuka (JP); Ryuichi Nishimura, Kimitsu (JP); Yasunori Sawa, Toyota (JP); Atsushi Ono, Ichihara (JP); Takeshi Kawachi, Kisarazu (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 84 days.

(21) Appl. No.: 15/502,114

(22) PCT Filed: Sep. 3, 2015

(86) PCT No.: PCT/JP2015/075065
§ 371 (c)(1),
(2) Date: Feb. 6, 2017

(87) PCT Pub. No.: WO2016/035851
PCT Pub. Date: Mar. 10, 2016

(65) Prior Publication Data
US 2017/0233008 A1    Aug. 17, 2017

(30) Foreign Application Priority Data

Sep. 5, 2014   (JP) .................................. 2014-181190
Jan. 29, 2015  (JP) .................................. 2015-015694

(51) Int. Cl.
*B60N 99/00*    (2006.01)
*B62D 25/02*    (2006.01)
(Continued)

(52) U.S. Cl.
CPC ........... *B62D 25/025* (2013.01); *B62D 21/02* (2013.01); *B62D 21/15* (2013.01); *B62D 25/04* (2013.01); *B62D 25/20* (2013.01)

(58) Field of Classification Search
CPC ....... B62D 25/025; B62D 21/15; B62D 25/04
See application file for complete search history.

(56) References Cited

U.S. PATENT DOCUMENTS 4,911,495 A    3/1990  Haga et al.
2009/0121522 A1  5/2009  An et al.
(Continued)

FOREIGN PATENT DOCUMENTS

CN    102171092 A    8/2011
JP    2-283578 A     11/1990
(Continued)

OTHER PUBLICATIONS

Extended European Search Report dated Apr. 6, 2018, issued in European Patent Application No. 15837280.5.
(Continued)

*Primary Examiner* — Lori L Lyjak
(74) *Attorney, Agent, or Firm* — Birch, Stewart, Kolasch & Birch, LLP

(57) ABSTRACT

This automobile member has a closed cross section including joint portions in which edge portions of two side walls of an inner panel are joined with edge portions of two side walls of an outer panel, in which in a first region, a first region outer height $ho_1$ and a first region inner height $hi_1$ have a constant value and the difference between the first region outer height $ho_1$ and the first region inner height $hi_1$ is smaller than the difference between a second region outer height $ho_2$ and a second region inner height $hi_2$; in a second region, the second region outer height $ho_2$ has a value which is larger than the second region inner height $hi_2$ and constant, (Continued)

or the second region outer height $ho_2$ has a value which is smaller than the second region inner height $hi_2$ and constant; in a first transition region, a first transition region outer height $ho_{1-2}$ is continuously varied between the first region outer height $ho_1$ and the second region outer height $ho_2$, and a first transition region inner height $hi_{1-2}$ is continuously varied between the first region inner height $hi_1$ and the second region inner height $hi_2$.

20 Claims, 16 Drawing Sheets

(51) Int. Cl.
  *B62D 21/02* (2006.01)
  *B62D 25/04* (2006.01)
  *B62D 25/20* (2006.01)
  *B62D 21/15* (2006.01)

(56) References Cited

U.S. PATENT DOCUMENTS

| | | | |
|---|---|---|---|
| 2013/0187406 A1* | 7/2013 | Torii | B62D 25/025 296/187.12 |
| 2014/0001790 A1* | 1/2014 | Zischke | B62D 25/2018 296/187.03 |

FOREIGN PATENT DOCUMENTS

| | | |
|---|---|---|
| JP | 3-184685 A | 8/1991 |
| JP | 4-215569 A | 8/1992 |
| JP | 2689595 B2 | 12/1997 |
| JP | 2005-343329 A | 12/2005 |
| JP | 2007-196748 A | 8/2007 |
| JP | 2014-40209 A | 3/2014 |
| SU | 1684151 A1 | 10/1991 |

OTHER PUBLICATIONS

International Search Report for PCT/JP2015/075065 (PCT/ISA/210) dated Nov. 17, 2015.
Written Opinion of the International Searching Authority for PCT/JP2015/075065 (PCT/ISA/237) dated Nov. 17, 2015.
Chinese Office Action and Search Report for counterpart Chinese Application No. 201580046908.9, dated May 24, 2018, with an English translation of the Search Report.
Russian Office Action for counterpart Russian Application No. 2017106445, dated May 29, 2018, with an English translation of the Office Action.

* cited by examiner

AUTOMOBILE MEMBER

TECHNICAL FIELD

The present invention relates to an automobile member.

Priority is claimed on Japanese Patent Application No. 2014-181190, filed Sep. 5, 2014, and Japanese Patent Application No. 2015-015694, filed Jan. 29, 2015, the contents of which are incorporated herein by reference.

RELATED ART

Most of body shells of automobile vehicle bodies having the so-called monocoque structure are equipped with a platform, left and right body sides, and an engine compartment provided at a body shell front part. The platform has a floor panel. The left and right body sides are mounted on both sides of the platform. The engine compartment has a frontside member as a constituent member.

Each body side has an A pillar, a B pillar, a roof rail side, and a side sill (kicker). The roof rail side is welded to respective upper end portions of the A pillar and the B pillar. Resistance spot welding (it abbreviates to spot welding hereafter), laser welding, and the like are mainly used for welding of an automobile member. The side sill is welded to respective lower end portions of the A pillar and the B pillar, and the front end portion of a rear wheel housing outer.

Generally, the side sill is equipped with a side sill inner panel having a substantially hat-shaped cross-sectional shape, and a side sill outer panel having a substantially hat-shaped cross-sectional shape. Both of the side sill inner panel and the side sill outer panel have a top plate, two side walls connected to this top plate, and outward flanges connected to the two side walls, respectively. An integral side sill is formed by spot-welding the two outward flanges of the side sill inner panel and the two outward flanges of the side sill outer panel to each other in an overlapped state. The side sill formed in this way is an elongated hollow tubular body.

The side sill is spot-welded to the floor panel via the upward flanges formed on both sides of a front floor panel. Any deflection resulting from elastic deformation of the floor panel during traveling of a vehicle is suppressed by the side sill. In this way, the side sill gives desired bending rigidity and torsional rigidity to a body shell. Moreover, at the time of collision of the vehicle, the side sill is deformed due to an impact load, and absorbs striking energy. As a result, a passenger's safety is ensured at the time of the collision of the vehicle.

The side sill is a member that absorbs the striking energy by causing so-called three-point bending deformation mainly at the time of a side collision. For this reason, in the related art, design and development of the side sill have been performed by adopting increasing impact energy absorption amount (EA) with respect to the three-point bending deformation as a main design target.

Meanwhile, in recent years, in order to further improve the collision safety performance of the vehicle, a front collision test or a rear collision test in which small overlap (SOI) is supposed begins to be adopted. In the small overlap front collision test, the vehicle is made to collide against a fixed barrier at 64 km/h such that a 25% part of the overall vehicle width in a front end portion of the vehicle hits a fixed barrier. In such a small overlap front collision, the fixed barrier collides outside an impact-absorbing structure (for example, a frontside member or the like) provided at a front part of the vehicle. Therefore, it is difficult to sufficiently absorb the striking energy due to the impact-absorbing structure of the front part of the vehicle.

However, as a result of the small overlap front collision test, it turned out that the axial crushing deformation occurs in the side sill at the time of a collision, and thereby the striking energy is absorbed by the side sill. For this reason, from a viewpoint of improvement in the collision safety performance of the vehicle, increasing impact energy absorption amounts with respect to two different deformation modes such as the three-point bending deformation and the axial crushing deformation are strongly required for recent side sills.

As described above, the front end portion of the side sill is spot-welded to a lower end portion (lower A pillar) of an A pillar, a substantially central portion of the side sill in its longitudinal direction is spot-welded to a lower end portion of the B pillar, and a rear end portion of the side sill is spot-welded to a front end portion of the wheel housing outer. At the time of the collision of the vehicle, early breaking (spot breaking) often occurs with each of a welded spot between the side sill and the lower A pillar, a welded spot between the side sill and the B pillar, and a welded spot between the side sill and the wheel housing outer as a starting point. It is known that, due to this early spot breaking, the design philosophy of a load path for propagating the striking energy sequentially to structural members and absorbing the striking energy cannot be sufficiently realized, and the impact energy absorption amount decreases.

A vehicle body front part structure configured such that a cross section of a side sill in a vertical direction of a vehicle varies in a longitudinal direction of the vehicle in order to improve the front collision safety performance of the vehicle is disclosed in Patent Document 1. Additionally, a technique of forming an integral side sill by welding a cut and raised portion formed in an upper surface of a side sill inner panel and a cutout formed in an upper surface of a side sill outer panel in a state where are made to coincide with each other in order to improve the assemblability and weldability of the side sill inner panel and the side sill outer panel is disclosed in Patent Document 2.

FIG. 16 is a top view partially illustrating an arrangement situation of a frontside member 40 in a simplified manner. An A-A cross section is altogether illustrated in FIG. 16. FIG. 17 is a top view illustrating a deformation behavior of the frontside member 40 in a front collision in a simplified manner.

As illustrated in FIG. 16, generally, the frontside member 40 has a hat-shaped panel 41 having a constant cross-sectional shape (hat shape) in a material axis direction, and a flat plate-shaped closing plate 42. The hat-shaped panel 41 has a top plate 41a, two side walls 41b connected to the top plate 41a, and outward flanges 41c connected to the two side walls 41b, respectively. The integral frontside member 40 is formed by spot-welding the two outward flanges 41c of the hat-shaped panel 41 and the closing plate 42 in an overlapped state. The frontside member 40 formed in this way is an elongated hollow tubular body. The frontside member 40 is disposed inside an engine compartment 43 of the vehicle body front part.

The two outward flanges 41c of the hat-shaped panel 41 are disposed on a vehicle outside. For this reason, a wide flat side wall 41b of the frontside member 40 can be used as a mounting surface of an engine mount bracket 46. Accordingly, components near the engine compartment 43, such as the engine mount bracket 46 that supports the transverse-mounted engine 44, can be certainly fixed to an upper surface (side wall 41*b*) of the frontside member 40. Additionally, at the time of a front collision, as illustrated by a circled portion in FIG. 17, the frontside member 40 can be bent and deformed toward a vehicle inside. Additionally, in a case where the outward flanges 41*c* are disposed on the vehicle inside, the frontside member 40 can be bent toward the vehicle inside at the time of the front collision.

In this way, the frontside member 40 gives desired bending rigidity and torsional rigidity to the body shell, and supports important components, such as heavy goods such as the engine 44, and a suspension. Additionally, at the time of the front collision of the vehicle, the frontside member 40 is deformed due to an impact load applied via a front crash box 45 (refer to FIG. 16) disposed at a front end portion thereof, and absorbs collision energy. As a result, deformation of a passenger compartment is suppressed and a passenger's safety is ensured.

A frontside member having a hat-shaped panel located on a vehicle inside and a closing plate located on a vehicle outside is disclosed in Patent Document 3. In the technique disclosed in Patent Document 3, the frontside member is prevented from buckling easily due to an impact force at a front collision by devising the structure of a bending portion that is present in a longitudinal direction of the frontside member. According to this technique, the impact force at the front collision is effectively relieved, and the deformation of a vehicle body is suppressed.

PRIOR ART DOCUMENT

Patent Literature

Patent Document 1: Japanese Patent No. 2689595
Patent Document 2: Japanese Unexamined Patent Application, First Publication No. H3-184685
Patent Document 3: Japanese Unexamined Patent Application, First Publication No. 2014-40209

DISCLOSURE OF THE INVENTION

Problems to be Solved by the Invention

The side sill disclosed in Patent Document 1 is not developed for the purpose of improving the side collision safety performance of the vehicle, and has room for an improvement from a viewpoint of improvement in safety against a side collision. Additionally, the side sill disclosed in Patent Document 2 cannot improve the impact energy absorption amount with respect to the two different deformation modes such as the three-point bending deformation and the axial crushing deformation.

FIG. 18 is an explanatory view schematically illustrating problems of the frontside member 40 illustrated in FIG. 16. In addition, the frontside member disclosed in Patent Document 3 also has the same problems.

If an impact load is applied to the frontside member 40 via the crash box 45 at the time of a front collision, as illustrated by a circled portion in FIG. 18, a spot-welded portion (a site joined by spot welding) between the outward flanges 41*c* of the hat-shaped panel 41 and the closing plate 42 is broken at an early stage on a front end side of the frontside member 40, and the closing plate 42 is cut apart from the hat-shaped panel 41. If such a phenomenon (spot breaking) occurs on the front end side of the frontside member 40, the impact energy absorption amount in the remaining sites of the frontside member 40 decreases.

In this way, in the related-art side sills, the impact energy absorption amount with respect to the two different deformation modes such as the three-point bending deformation and the axial crushing deformation cannot be improved. Additionally, in the related-art frontside member, suppressing the occurrence of the spot breaking at the time of a front collision while maintaining the mountability of the engine mount bracket is not possible.

The invention has been made in view of the above circumstances, and an object thereof is to provide an automobile member in which the two properties that could not be compatible with each other in the related art are compatible with each other.

Means for Solving the Problem

The present inventors repeated keen study in order to solve the above problems, and consequently could obtain the knowledge listed below, and further repeated the study to complete the invention.

(A) By making the overlapped joining positions of the side sill inner panel (inner panel) and the side sill outer panel (outer panel) different from each other in the longitudinal direction of the side sill, the impact energy absorption amount with respect to the three-point bending deformation occurring in the side sill at the time of a side collision can be increased. Even in a case where the axial crushing deformation occurs in the side sill at the time of a front collision or a rear collision including a small overlap collision, the occurrence of the spot breaking can be suppressed. Accordingly, the impact energy absorption amount with respect to the axial crushing deformation of the side sill is increased.

(B) By making the overlapped joining positions of the two outward flanges of the frontside member inner panel (inner panel) constituting the frontside member and the two outward flanges of the frontside member outer panel (outer panel) different from each other in a portion on the front end side in the longitudinal direction of the frontside member and the other portion, the occurrence of the spot breaking at the time of a front collision can be suppressed while reliably securing the mounting surface of the engine mount bracket.

The invention adopts the following means in order to solve the above problems to achieve the relevant object.

(1) An automobile member related to an aspect of the invention is an automobile member of a closed cross section including an inner panel having a top plate and two side walls connected to the top plate, and an outer panel having a top plate and two side walls connected to the top plate, and joint portions in which edge portions of the two side walls of the inner panel are respectively joined to edge portions of the two side walls of the outer panel. The automobile member includes a first region extending rearward from a front end portion of the automobile member; a first transition region extending rearward continuously with the first region; and a second region extending rearward continuously with the first transition region. When the height of the side walls of the outer panel in the first region is defined as a first region outer height $ho_1$, and the height of the side walls of the inner panel in the first region is defined as a first region inner height $hi_1$, when the height of the side walls of the outer panel in the second region is defined as a second region outer height $ho_2$, and the height of the side walls of the inner panel in the second region is defined as a second region inner height $hi_2$, and when the height of the side walls of the outer panel in the first transition region is defined as a first transition region outer height $ho_{1-2}$, and the height of the side walls of the inner panel in the first transition region is defined as a first transition region inner height $hi_{1-2}$, in the first region, the first region outer height $ho_1$ and the first region inner height $hi_1$ have constant values, and a difference between the first region outer height $ho_1$ and the first region inner height $hi_1$ is smaller than a difference between the second region outer height $ho_2$ and the second region inner height $hi_2$, in the second region, the second region outer height $ho_2$ has a constant value larger than the second region inner height $hi_2$, or the second region outer height $ho_2$ has a constant value smaller than the second region inner height $hi_2$, and in the first transition region, the first transition region outer height $ho_{1-2}$ continuously varies between the first region outer height $ho_1$ and the second region outer height $ho_2$, and the first transition region inner height $hi_{1-2}$ continuously varies between the first region inner height $hi_1$ and the second region inner height $hi_2$.

(2) The automobile member described in the above (1) may be a skeleton member of an automobile vehicle body.

(3) In the automobile member described in the above (2), the inner panel may be a side sill inner panel, the outer panel may be a side sill outer panel, and the skeleton member may be a side sill.

(4) In the automobile member described in the above (3), a lower A pillar connecting portion that is a site to which a lower A pillar is connected may be provided in a region including the front end portion in the first region, and a B pillar connecting portion that is a site to which a 13 pillar is connected may be provided in at least a portion of the second region. The first region may be a region to a position that is 150 mm or less apart rearward from a rear end of the lower A pillar connecting portion of the skeleton member, and the second region may be a region between a position that is 150 mm or less apart forward from the B pillar connecting portion, and a position that is 150 mm or less apart rearward from the B pillar connecting portion.

(5) In the automobile member described in the above (3) or (4), the following Relational Expression (a) may be satisfied in the first region, and the following Relational Expression (b) may be satisfied in the second region.

$$0.40 \times (hi_1 + ho_1) \leq ho_1 \leq 0.60 \times (hi_1 + ho_1) \quad (a)$$

$$0.10 \times (hi_2 + ho_2) \leq hi_2 \leq 0.40 \times (hi_2 + ho_2) \quad (b)$$

(6) The automobile member described in any one of the above (3) to (5) may further include a second transition region extending rearward continuously with the second region; and a third region extending to a rear end portion of the automobile member rearward continuously with the second transition region. When the height of the side walls of the outer panel in the third region is defined as a third region outer height $ho_3$, and the height of the side walls of the inner panel in the third region is defined as a third region inner height $hi_3$, and when the height of the side walls of the outer panel in the second transition region is defined as a second transition region outer height $ho_{2-3}$ and the height of the side walls of the inner panel in the second transition region is defined as the second transition region inner height $hi_{2-3}$, in the third region, the third region outer height $ho_3$ and the third region inner height $hi_3$ may have constant values, and a difference between the third region outer height $ho_3$ and the third region inner height $hi_3$ may be smaller than a difference between the second region outer height $ho_2$ and the second region inner height $hi_2$, and in the second transition region, the second transition region outer height $ho_{2-3}$ may continuously vary between the second region outer height $ho_2$ and the third region outer height $ho_3$, and the second transition region inner height $hi_{2-3}$ may continuously vary between the second region inner height $hi_2$ and the third region inner height $hi_3$.

(7) In the automobile member described in the above (6), the following Relational Expression (c) may be satisfied in the third region.

$$0.40 \times (hi_3 + ho_3) \leq ho_3 \leq 0.60 \times (hi_3 + ho_3) \quad (c)$$

(8) In the automobile member described in any one of the above (4) to (7), the lower A pillar may be connected to the lower A pillar connecting portion, and the B pillar may be connected to the B pillar connecting portion.

(9) In the automobile member described in the above (2), the inner panel may be a frontside member inner panel, the outer panel may be a frontside member outer panel, and the skeleton member may be a frontside member.

(10) In the automobile member described in the above (9), the following Relational Expression (a) may be satisfied in the first region.

$$0.40 \times (hi_1 + ho_1) \leq ho_1 \leq 0.60 \times (hi_1 + ho_1) \quad (a)$$

(11) In the automobile member described in the above (9) or (10), the first region is a region between the front end portion and a position that is 400 mm or less apart rearward from the front end portion.

(12) In the automobile member described in any one of the above (9) to (11), the second region may be a region that is present behind a position that is 150 mm or more apart from the front end portion.

(13) In the automobile member described in any one of the above (9) to (12), the following Relational Expression (d) or the following Relational Expression (e) may be satisfied in the second region.

$$0 \leq hi_2 \leq 0.40 \times (hi_2 + ho_2) \quad (d)$$

$$0 \leq ho_2 \leq 0.40 \times (hi_2 + ho_2) \quad (e)$$

(14) In the automobile member described in any one of the above (1) to (13), in at least portions of the joint portions, the edge portions may be flanges that are connected so as to be formed in the two side walls of each of the inner panel and the outer panel.

(15) In the automobile member described in the above (14), in at least portions of the joint portions, the flanges formed in the inner panel may be subjected to hemming working so as to cover the flanges formed in the outer panel, or the flanges formed in the outer panel may be subjected to hemming working so as to cover the flanges formed in the inner panel.

(16) In the automobile member described in any one of the above (1) to (13), in at least portions of the joint portion, edge portions of the two side walls of the inner panel may be respectively overlapped on and joined to edge portions of the two side walls of the outer panel.

(17) In the automobile member described in any one of the above (1) to (16), the joining may be performed using resistance spot welding.

(18) In the automobile member described in any one of the above (1) to (17), when the tensile strength of the outer panel is defined as TSo (MPa), the plate thickness of the outer panel is defined as to (mm), the tensile strength of the inner panel is defined as TSi (MPa), and the plate thickness of the inner panel is defined as ti (mm), the following Relational Expression (f) may be satisfied in a case where the second region outer height $ho_2$ is larger than the second region inner height $hi_2$, and the following Relational Expression (g) may be satisfied in a case where the second region outer height $ho_2$ is smaller than the second region inner height $hi_2$.

$$TSo \times to < TSi \times ti \quad (f)$$

$$TSo \times to > TSi \times ti \quad (g)$$

(19) An automobile member related to another aspect of the invention is an automobile member of a closed cross section including an inner panel having a top plate and two side walls connected to the top plate, and an outer panel having a top plate and two side walls connected to the top plate, and joint portions in which edge portions of the two side walls of the inner panel are respectively joined to edge portions of the two side walls of the outer panel. When the tensile strength of the outer panel is defined as TSo (MPa), and the plate thickness of the outer panel is defined as to (mm), the tensile strength of the inner panel is defined as TSi (MPa), the plate thickness of the inner panel is defined as ti (mm), the height of the side walls of the outer panel is defined as outer height ho, and the height of the side walls of the inner panel is defined is defined as inner height hi, the outer height ho and the inner height hi have constant values, respectively, in a length direction of the automobile member, the following Relational Expression (f) is satisfied in a case where the outer height ho is larger than the inner height hi, and the following Relational Expression (g) is satisfied in a case where the outer height ho is smaller than the inner height hi.

$$TSo \times to < TSi \times ti \quad (f)$$

$$TSo \times to > TSi \times ti \quad (g)$$

(20) In the automobile member described in the above (19), the automobile member is a side sill, and the side sill may have a side sill inner panel as the inner panel and have a side sill outer panel as the outer panel.

(21) In the automobile member described in the above (19), the automobile member may be a frontside member, and the frontside member may have a frontside member outer panel as the outer panel and may have a frontside member inner panel as the inner panel.

(22) In the automobile member according to any one of the above (1) to (21), the automobile member may be formed by a tailored welding blank, a tailored rolled blank, or combinations of these materials.

Here, a tailored welding blank (TWB) means one obtained by integrating two or more types of steel sheets having different plate thicknesses, tensile strengths, and the like in a material state with each other through welding (for example, butt welding). Additionally, a tailored rolled blank (TRB) means one obtained by changing the intervals of rolling rolls, thereby changing the plate thickness of a material, when manufacturing the material.

In the invention, the "front end portion" means an end portion of the automobile member related to the invention on a front side in a traveling direction of a vehicle equipped with the vehicle body on which the automobile member is mounted, and the "rear" means the rear in the traveling direction.

The height of the side walls in the invention means a distance in a direction orthogonal to the top plate from an outer surface of the top plate to an outer surface of the flanges.

The "automobile member" related to the invention means a member used for automobiles, for example, includes the skeleton member that forms the skeleton of the automobile vehicle body, or a member other than the skeleton member mounted on the automobile vehicle body. The "automobile member" related to the invention includes a center pillar (B pillar), a roof rail, an A pillar, or the like as the skeleton member of the automobile vehicle body in addition to the above side sill and the frontside member, and includes a subframe constituent member that supports a suspension as a member other than the skeleton member of the automobile vehicle body.

Effects of the Invention

According to the above aspects of the invention, the automobile member in which the two properties that could not be compatible with each other in the related art are compatible with each other can be provided.

Specifically, according to the above aspects of the invention, the skeleton members of the automobile vehicle body such as the side sill that in which both impact energy absorption amounts with respect to two different deformation modes such as the three-point bending deformation and the axial crushing deformation are increased, and the frontside member in which the occurrence of the spot breaking at the time of a front collision can be suppressed while maintaining the mountability of the engine mount bracket can be provided.

More specifically regarding the side sill, according to the above aspects of the invention, the impact energy absorption amount with respect to the three-point bending deformation occurring in the side sill at the time of a side collision can be increased. Even in a case where the axial crushing deformation occurs in the side sill at the time of a front collision or a rear collision including a small overlap collision, the occurrence of the spot breaking can be suppressed. Accordingly, the impact energy absorption amount with respect to the axial crushing deformation of the side sill can be increased.

of side walls in a second region is $h_{o2}:h_{i2}=1:1$, and a test piece of a present invention example that is $h_{o2}:h_{i2}=3:1$.

Figure 8:
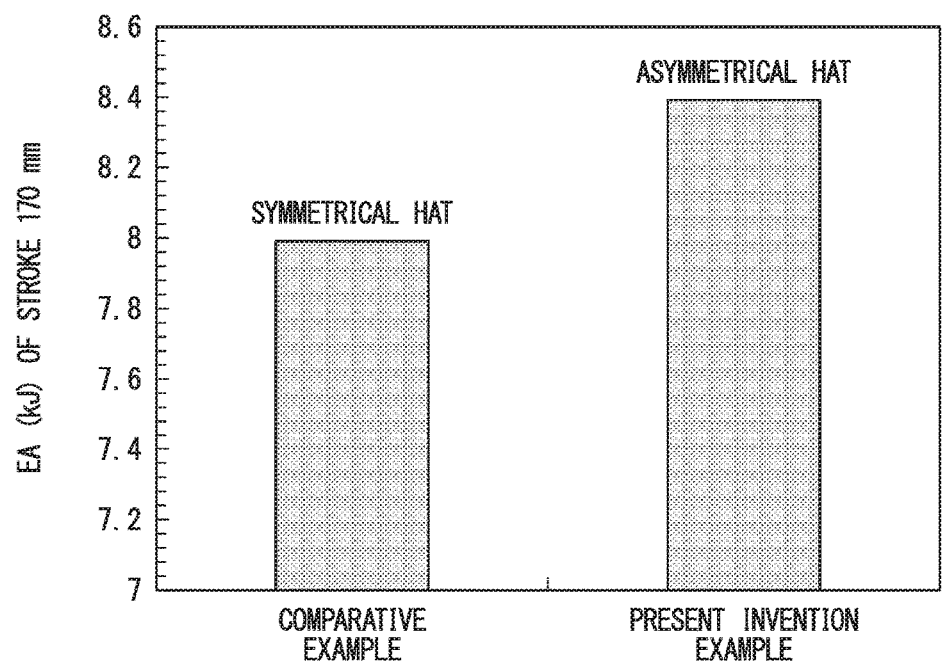

FIG. 8 is a graph illustrating collision absorbed energy EA (kJ) that is a numerical analysis result of the three-point bending deformation of the side collision test.

Figure 9A:
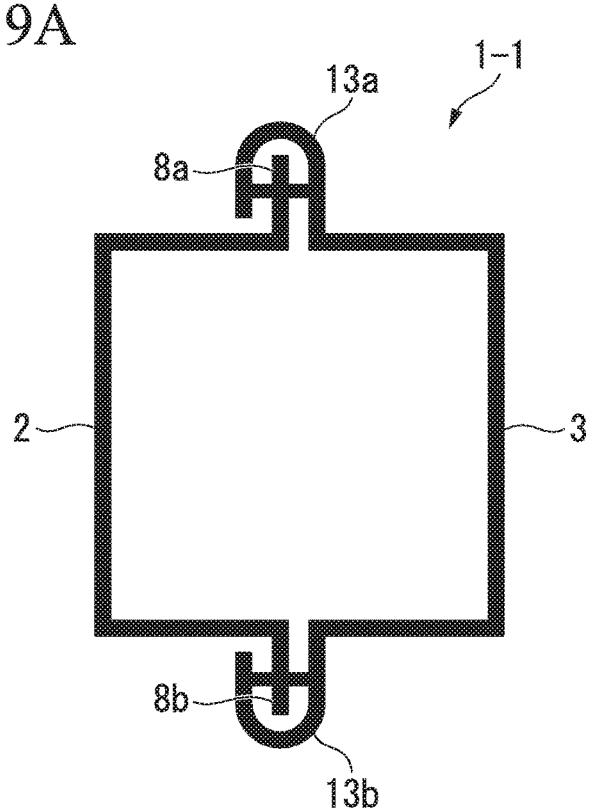

FIG. 9A is an explanatory view illustrating a first modification example of a mating structure of joint portions of a side sill inner panel and a side sill outer panel.

Figure 9B:
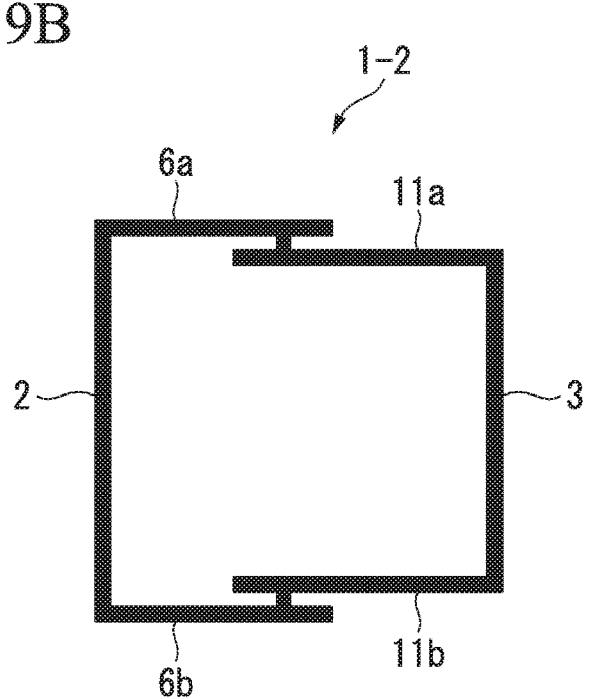

FIG. 9B is an explanatory view illustrating a second modification example of the mating structure of the joint portions of the side sill inner panel and the side sill outer panel.

Figure 10:
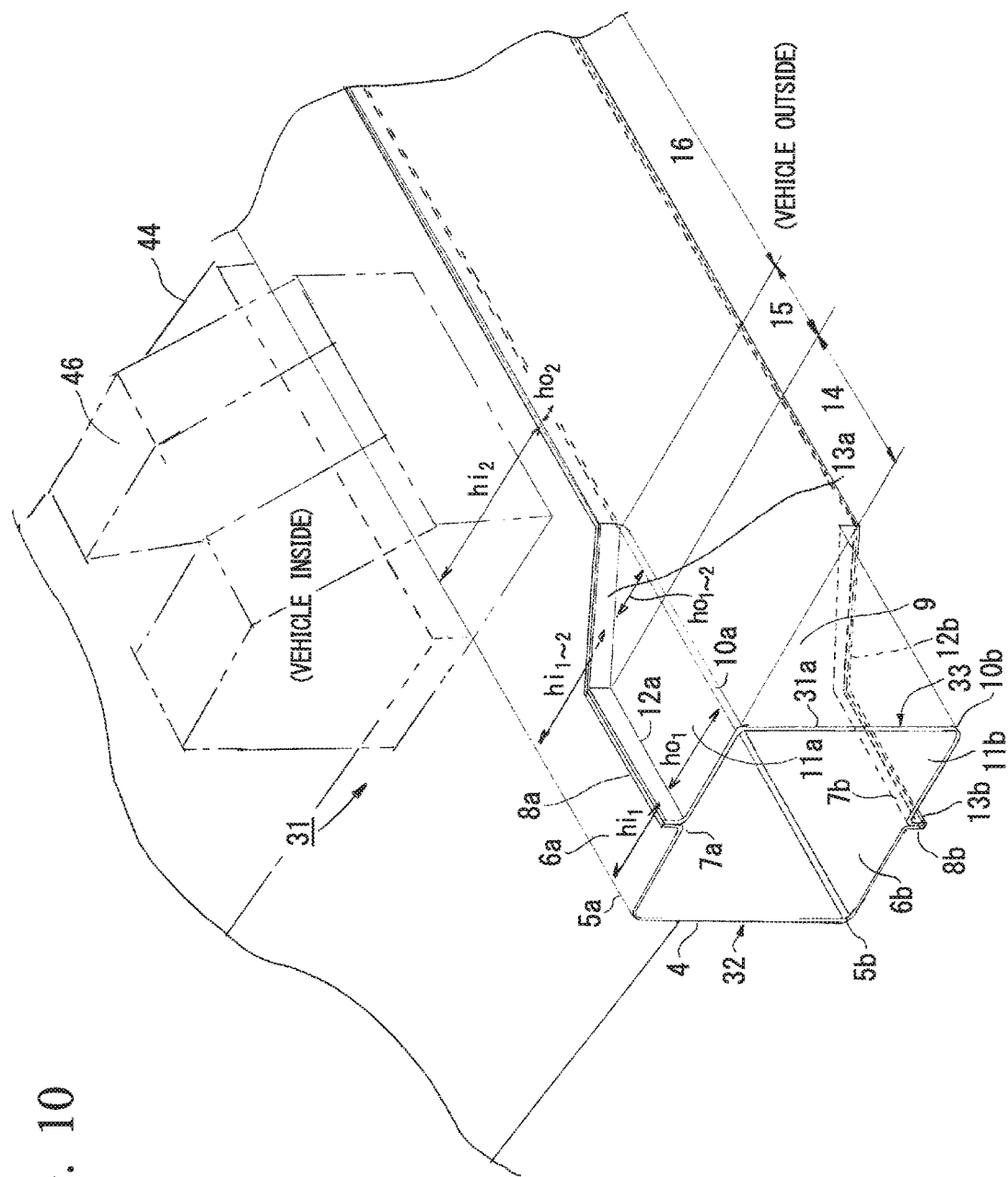

FIG. 10 is a perspective view illustrating a schematic configuration of a frontside member related to a second embodiment of the invention.

Figure 11:
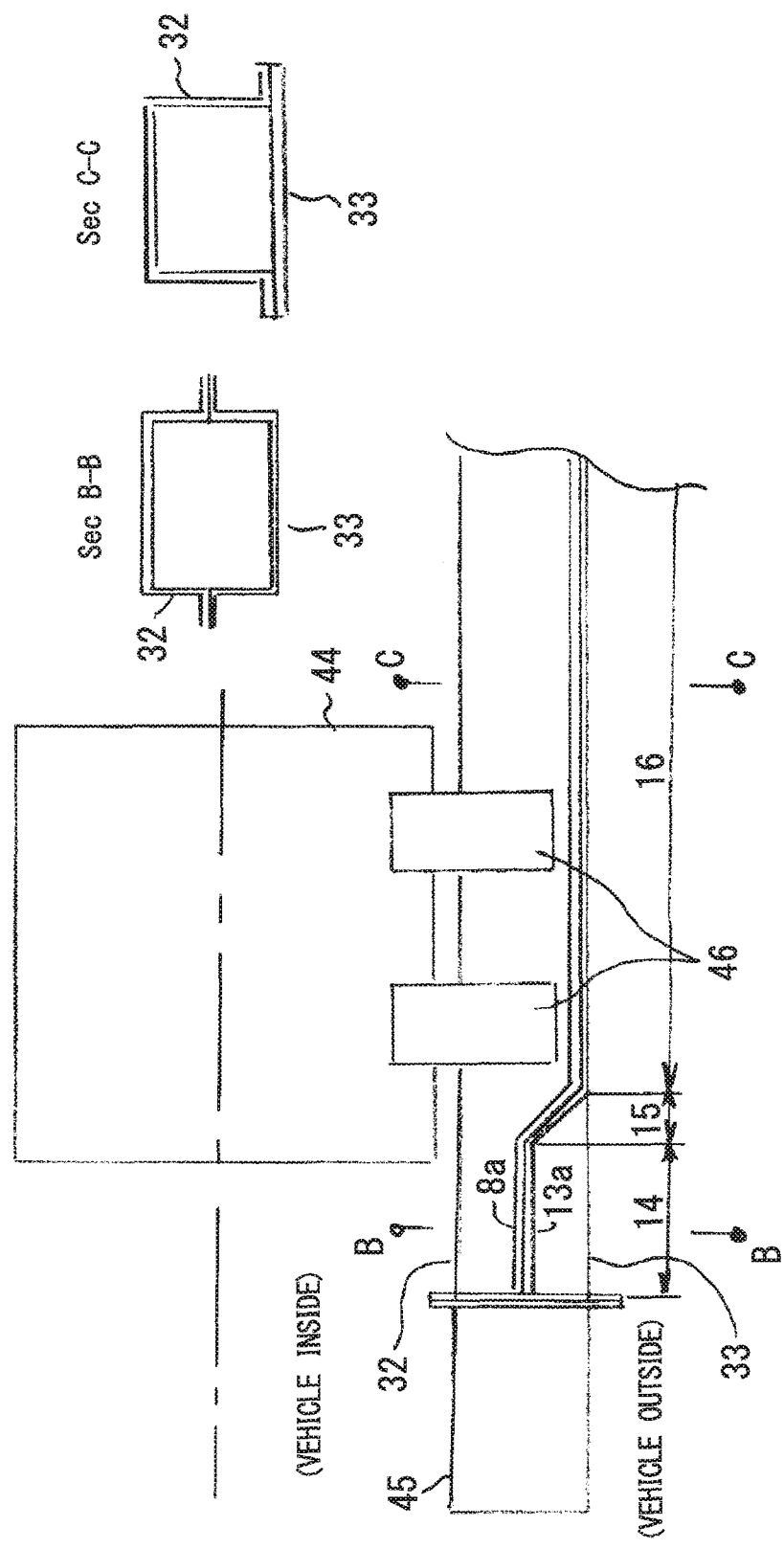

FIG. 11 is a top view partially illustrating an arrangement situation of a frontside member related to the second embodiment of the invention in a simplified manner.

Figure 12A:
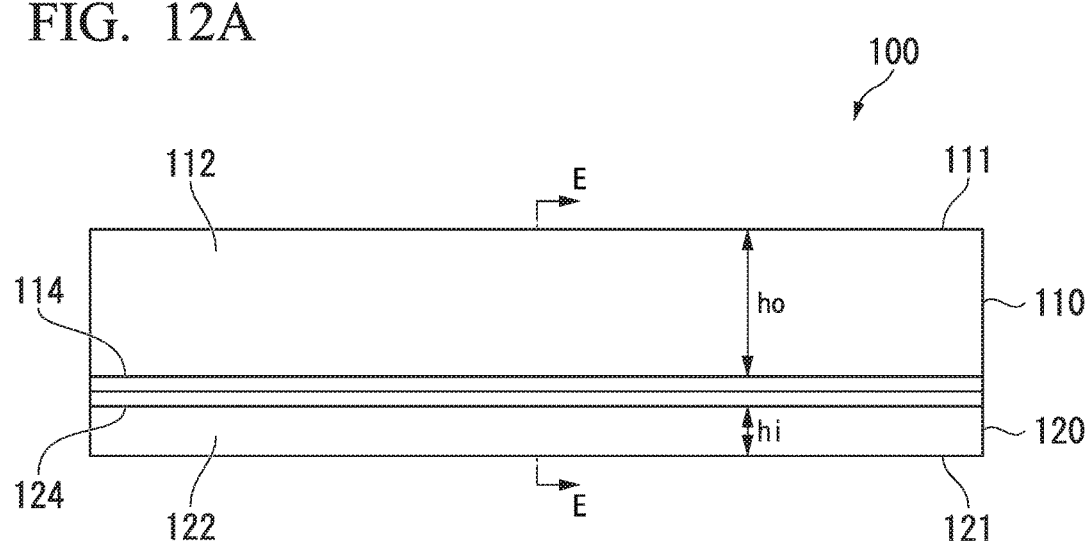

FIG. 12A is a plan view illustrating a schematic configuration of a side sill related to a third embodiment of the invention.

Figure 12B:
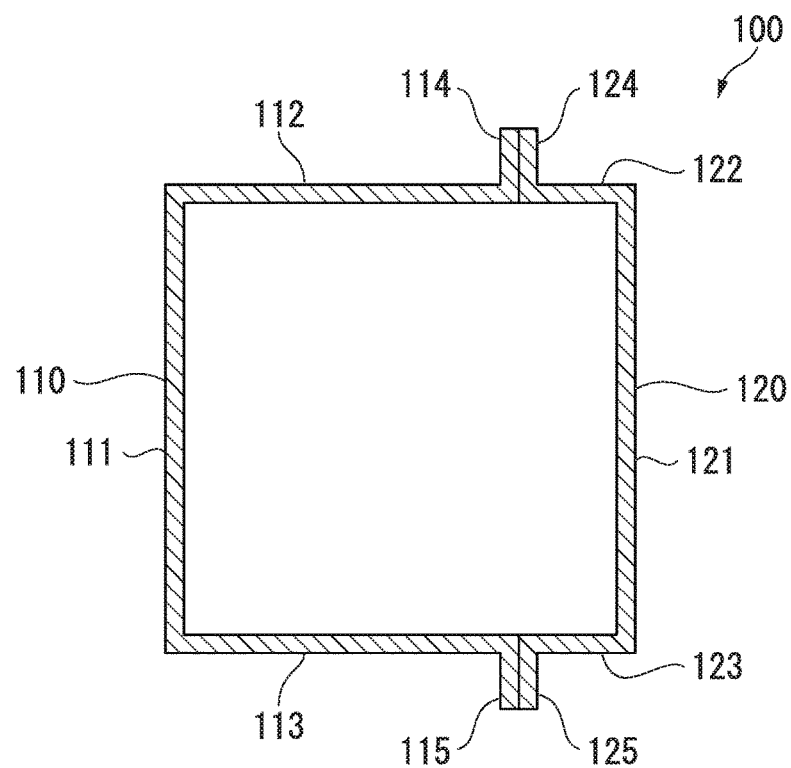

FIG. 12B is an E-E arrow cross-sectional view of the side sill illustrated in FIG. 12A.

Figure 13A:
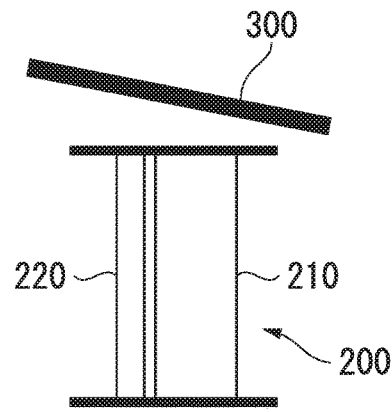

FIG. 13A is an explanatory view schematically illustrating the numerical analysis conditions of the axial crushing deformation.

Figure 13B:
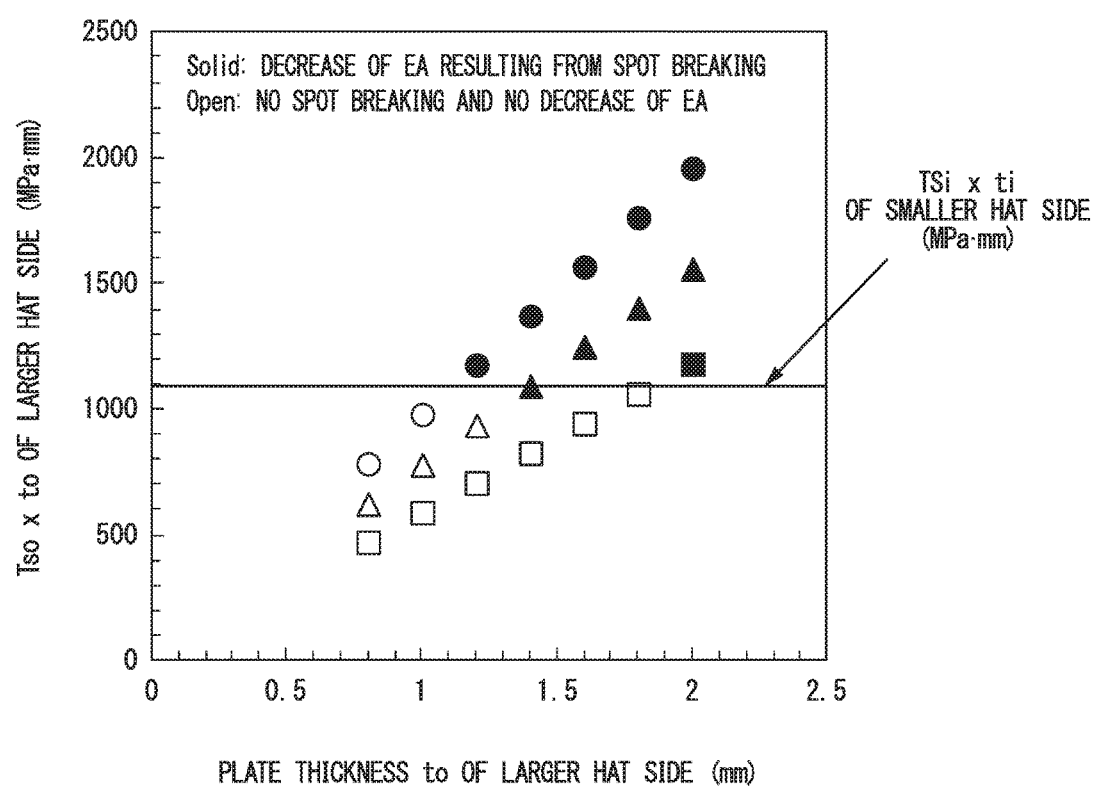

FIG. 13B is a view graphing a correspondence relationship between a multiplication value (TSo×to) of tensile strength TSo and plate thickness to of a hat-shaped panel on a larger hat side (side sill outer panel), and the plate thickness to.

Figure 14:
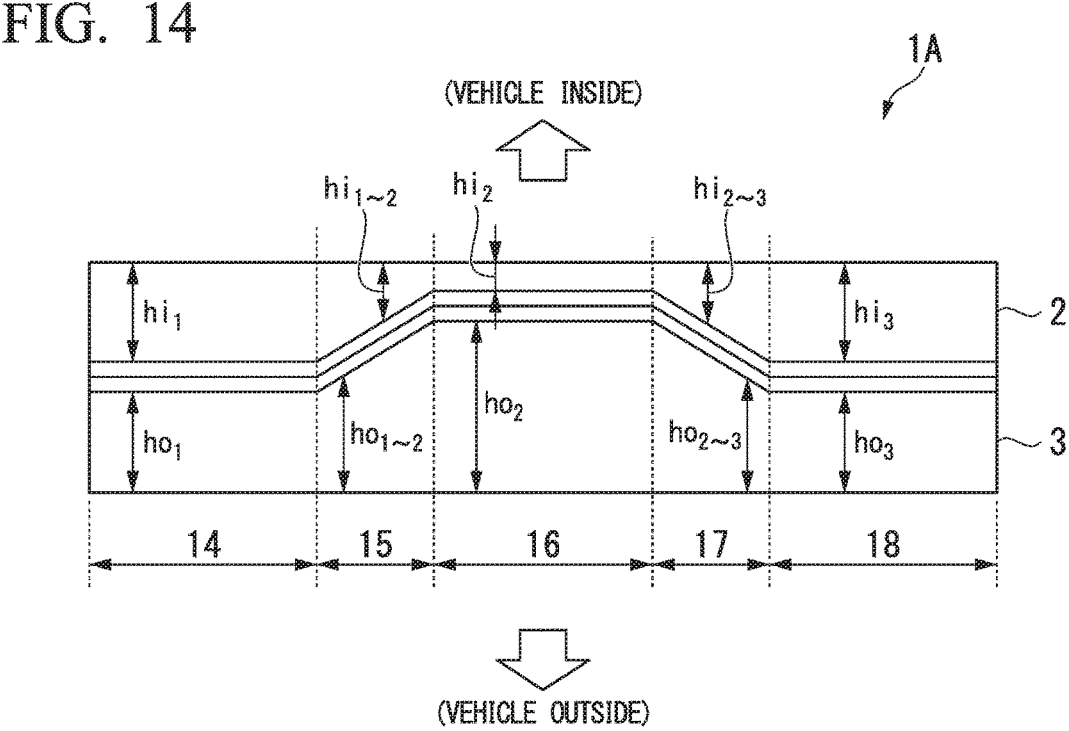

FIG. 14 is a plan view illustrating a schematic configuration of a side sill 1A related to a fourth embodiment of the invention.

Figure 15:
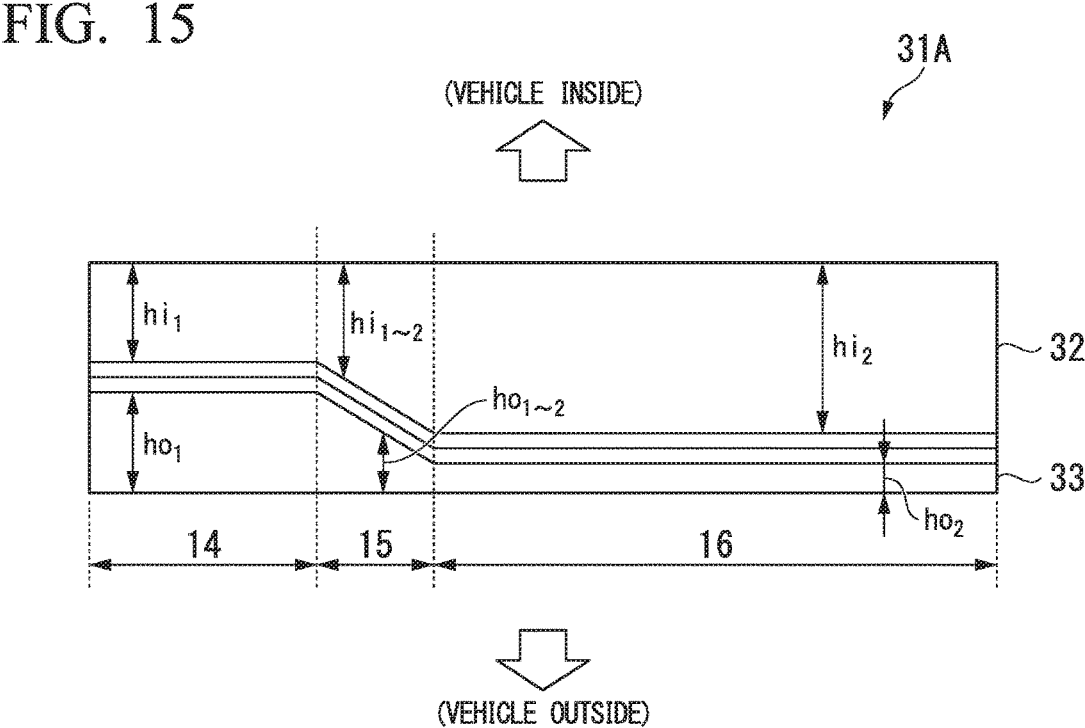

FIG. 15 is a plan view illustrating a schematic configuration of a frontside member 31A related to a fifth embodiment of the invention.

Figure 16:
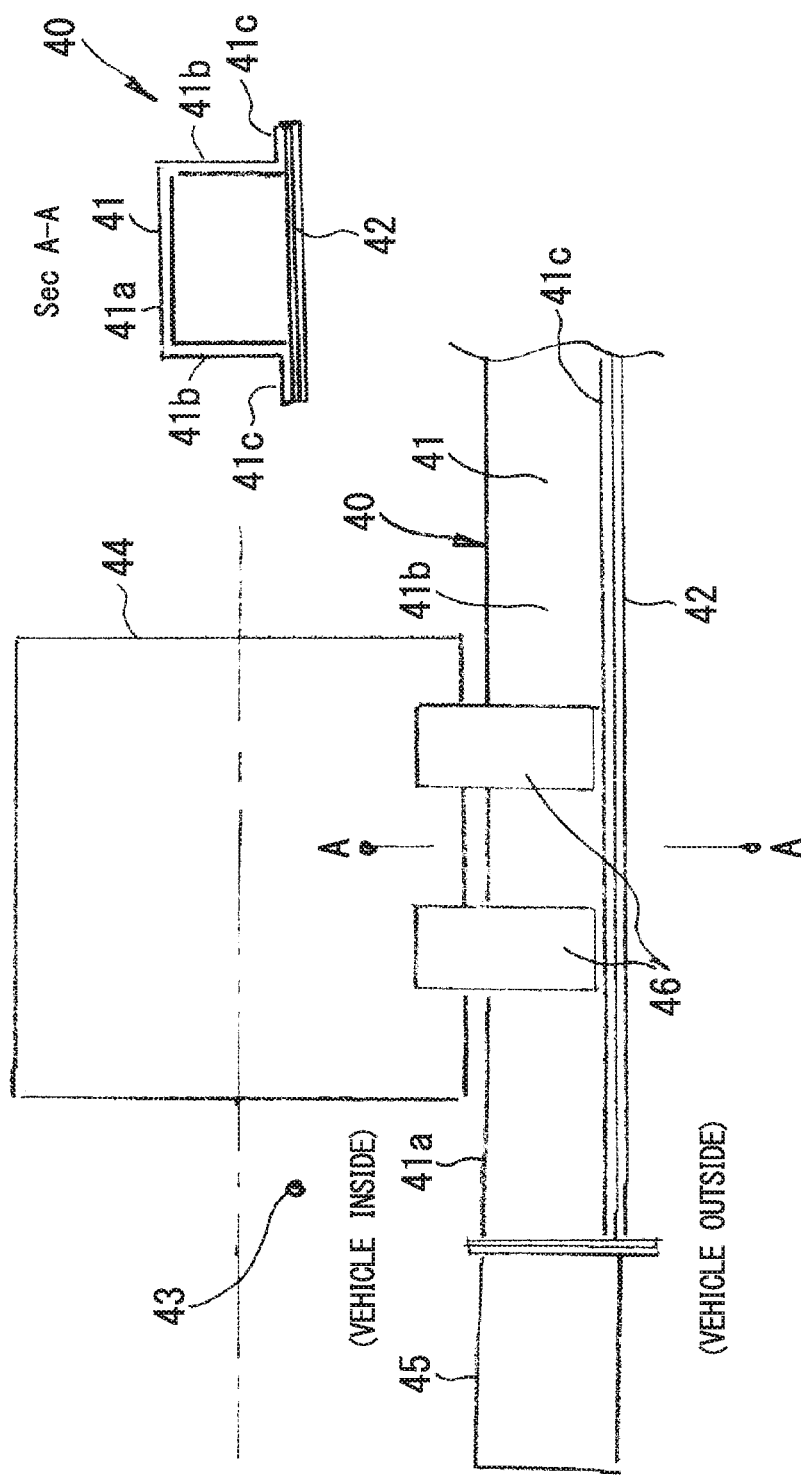

FIG. 16 is a top view partially illustrating an arrangement situation of a frontside member in a simplified manner in the related art.

Figure 17:
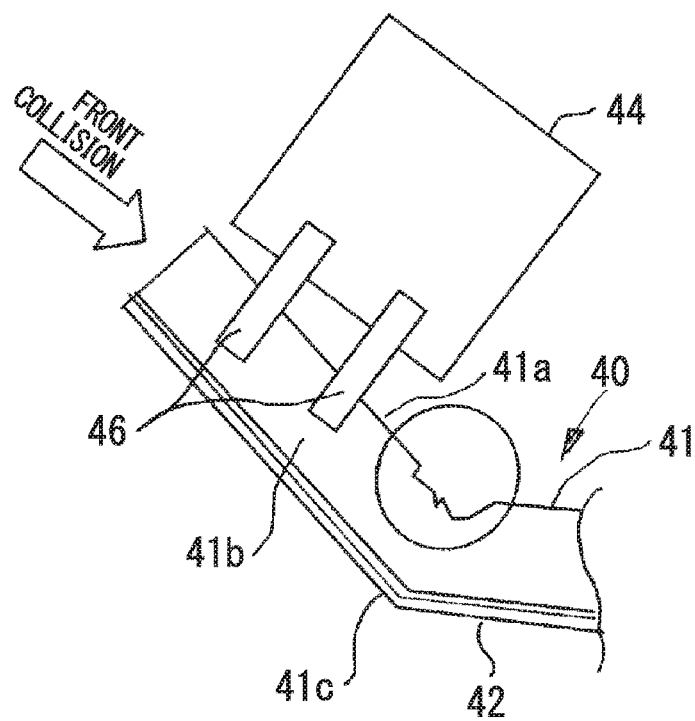

FIG. 17 is a top view illustrating a deformation behavior of the frontside member in a front collision in a simplified manner.

Figure 18:
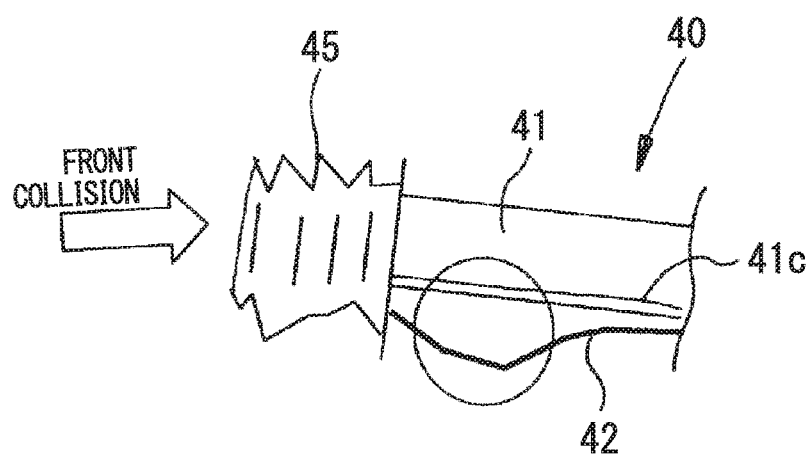

FIG. 18 is an explanatory view schematically illustrating problems of a frontside member disclosed in Patent Document 3 and the frontside member illustrated in FIG. 16.

DESCRIPTION OF EMBODIMENTS

Hereinafter, embodiments of the invention will be described in detail with reference to the drawings.

First Embodiment

A first embodiment of the invention will first be described. In the first embodiment, a side sill that is a skeleton member of an automobile vehicle body is exemplified as an automobile member related to the invention. This side sill has a side sill inner panel as an inner panel and has a side sill outer panel as an outer panel. Although a case where the automobile member related to the invention has a substantially quadrangular cross-sectional shape is exemplified in the subsequent description, the invention can also be applied to an automobile member having, for example, a polygonal cross-sectional shape, such as a hexagon or an octagon, which has an upper side and a lower side that face each other.

Figure 1:
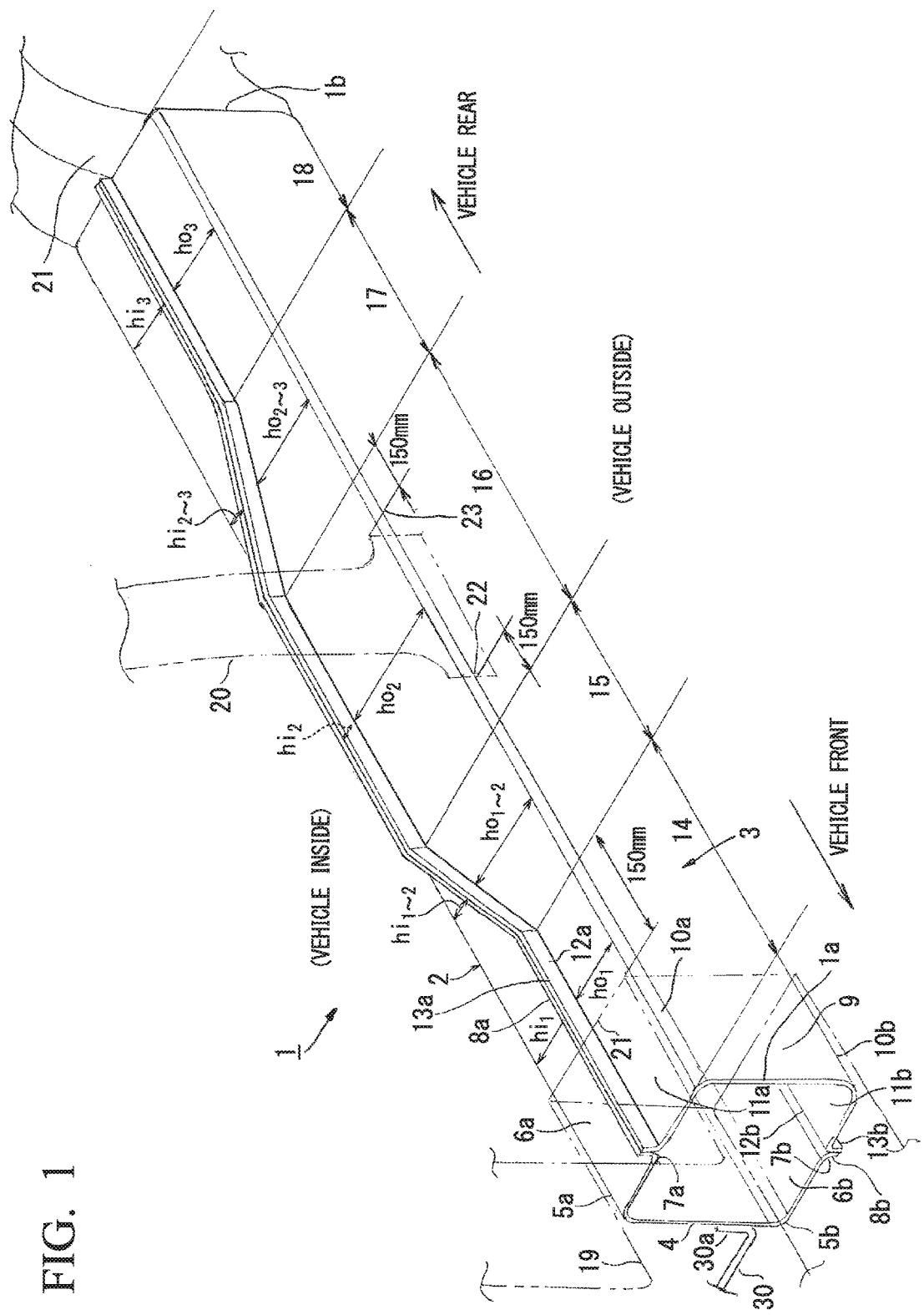
FIG. 1 is a perspective view illustrating a schematic configuration of a side sill related to a first embodiment of the invention.

FIG. 1 is a perspective view illustrating a schematic configuration of a side sill 1 related to the first embodiment of the invention.

The side sill 1 has at least a side sill inner panel 2 and a side sill outer panel 3. The side sill inner panel 2 and the side sill outer panel 3 are respectively shape steels formed from high-tensile steel sheets having a plate thickness of 1.0 mm or more. Although not illustrated in FIG. 1, the side sill 1 usually further has a side sill outer panel that is a low-strength material having a plate thickness of 1.0 mm or less as an outer plate. A side sill reinforcement (reinforcing plate) may be provided between the side sill inner panel 2 and the side sill outer panel 3 or between the side sill outer panel 3 and the side sill outer panel serving as the outer plate.

The side sill inner panel 2 has at least a top plate 4 and two side walls 6a and 6b connected to the top plate 4. Since the side sill inner panel 2 is manufactured by press working using ordinary bending forming or throttle forming, and roll working using bending forming, the side sill inner panel 2 has ridgelines 5a and 5b connected to the top plate 4 and the side walls 6a and 6b.

Additionally, edge portions of the side sill inner panel 2 are provided with outward flanges 8a and 8b connected to the two side walls 6a and 6b. The outward flanges 8a and 8b are joining margins joined by, for example, resistance spot welding or the like in a state where the outward flanges 8a and 8b are overlapped on outward flanges 13a and 13b provided at edge portions of the side sill outer panel 3. For this reason, the side sill inner panel 2 further has curved portions 7a and 7b connected to the side walls 6a and 6b and the outward flanges 8a and 8b.

The respective curvature radii of the ridgelines 5a and 5b and the curved portions 7a and 7b are values such that manufacture is performed by the above-described ordinary working methods, and are usually 3 to 20 mm.

Moreover, the side sill inner panel 2 is joined to a front floor panel 30 via an upward flange 30a that is resistance spot welded to the top plate 4.

Meanwhile, the side sill outer panel 3 has at least a top plate 9, and two side walls 11a and 11b connected to the top plate 9, similar to the side sill inner panel 2. Since the side sill outer panel 3 is manufactured by the press working using the ordinary bending forming or throttle forming or the roll working using the bending forming, the side sill outer panel 3 has ridgelines 10a and 10b connected to the top plate 9 and the side walls 11a and 11b.

Additionally, the edge portions of the side sill outer panel 3 are provided with the outward flanges 13a and 13b connected to the two side walls 11a and 11b. The outward flanges 13a and 13b are joining margins joined by, for example, the resistance spot welding or the like in a state where the outward flanges 13a and 13b are overlapped on the outward flanges 8a and 8b provided at the edge portions of the side sill inner panel 2. For this reason, the side sill outer panel 3 further has curved portions 12a and 12b connected to the side walls 11a and 11b and the outward flanges 13a and 13b.

The respective curvature radii of the ridgelines 10a and 10b and the curved portions 12a and 12b are values such that manufacture is performed by the above-described ordinary working methods, and are usually 3 to 20 mm.

Although a case where the outward flanges 8a and 8b are joined to the outward flanges 13a and 13b by the resistance spot welding has been exemplified in the above description, for example, it is also possible to use other joining methods, such as other kinds of welding such as laser welding or electric arc welding other than the resistance spot welding, bonding, and brazing.

The side sill 1 has a first region 14, a first transition region 15, a second region 16, a second transition region 17, and a third region 18.

The first region 14 extends rearward from a front end portion 1a of the side sill 1. The first transition region 15 extends rearward continuously with the first region 14. The second region 16 extends rearward continuously with the first transition region 15. The second transition region 17 extends rearward continuously with the second region 16. Moreover, the third region 18 extends to a rear end portion 1b of the side sill 1 rearward continuously with the second transition region 17. The rear end portion 1b of the third region 18 is connected to a rear wheel housing outer panel 21.

In the following, the height of the side walls 11a and 11b of the side sill outer panel 3 in the first region 14 is defined as a first region outer height $ho_1$, and the height of the side walls 6a and 6b of the side sill inner panel 2 in the first region 14 is defined as a first region inner height $hi_1$.

The height of the side walls 11a and 11b of the side sill outer panel 3 in the second region 16 is defined as a second region outer height $ho_2$, and the height of the side walls 6a and 6b of the side sill inner panel 2 in the second region 16 is defined as a second region inner height $hi_2$. The height of the side walls 11a and 11b of the side sill outer panel 3 in the first transition region 15 is defined as a first transition region outer height $ho_{1\sim2}$, and the height of the side walls 6a and 6b of the side sill inner panel 2 in the first transition region 15 is defined as a first transition region inner height $hi_{1\sim2}$.

The height of the side walls 11a and 11b of the side sill outer panel 3 in the third region 18 is defined as a third region outer height $ho_3$, and the height of the side walls 6a and 6b of the side sill inner panel 2 in the third region 18 is defined as a third region inner height $hi_3$. The height of the side walls 11a and 11b of the side sill outer panel 3 in the second transition region 17 is defined as a second transition region outer height $ho_{2\sim3}$, and the height of the side walls 6a and 6b of the side sill inner panel 2 in the second transition region 17 is defined as a second transition region inner height $hi_{2\sim3}$.

In the first region 14, the first region outer height $ho_1$ and the first region inner height $hi_1$ have constant values, and a difference between the first region outer height $ho_1$ and the first region inner height $hi_1$ is smaller than a difference between the second region outer height $ho_2$ and the second region inner height $hi_2$.

In the second region 16, the second region outer height $ho_2$ has a constant value larger than the second region inner height $hi_2$.

In the first transition region 15, the first transition region outer height $ho_{1\sim2}$ continuously varies between the first region outer height $ho_1$ and the second region outer height $ho_2$, and the first transition region inner height $hi_{1\sim2}$ continuously varies between the first region inner height $hi_1$ and the second region inner height $hi_2$.

A lower A pillar connecting portion 21, which is a site to which a lower A pillar 19 illustrated with a two-dot chain line is connected, is provided in a region, including the front end portion 1a of the side sill 1, in the first region 14. Additionally, at least a portion of the second region 16 is provided with B pillar connecting portions (a 13 pillar front connecting portion 22 and a B pillar rear connecting portion 23), which is a site to which a B pillar 20 illustrated with a two-dot chain line is connected.

The first region 14 is a region up to a position that is 150 mm or less apart rearward from a rear end of the lower A pillar connecting portion 21 of the side sill 1. Although the lower A pillar 19 hangs over the side sill 1 in the example illustrated in FIG. 1, a rear end portion of the lower A pillar 19 and the front end portion 1a of the side sill 1 may be butted against and connected to each other. In any case, the first region 14 is the region up to the position that is 150 mm or less apart rearward from the rear end of the lower A pillar connecting portion 2L Additionally, the second region 16 is a region between a position that is 150 mm or less apart forward from the B pillar connecting portion (B pillar front connecting portion 22), and a position that is 150 mm or less apart rearward from the B pillar connecting portion (the B pillar rear connecting portion 23).

Meanwhile, in the third region 18, the third region outer height $ho_3$ and the third region inner height $hi_3$ have constant values, and a difference between the third region outer height $ho_3$ and the third region inner height $hi_3$ is smaller than a difference between the second region outer height $ho_2$ and the second region inner height $hi_2$.

In the second transition region 17, the second transition region outer height $ho_{2\sim3}$ continuously varies between the second region outer height $ho_2$ and the third region outer height $ho_3$, and the second transition region inner height $hi_{2\sim3}$ continuously varies between the second region inner height $hi_2$ and the third region inner height $hi_3$.

By setting the first region outer height $ho_1$, the first region inner height $hi_1$, the second region outer height $ho_2$, the second region inner height $hi_2$, the first transition region outer height $ho_{1\sim2}$, the first transition region inner height the third region outer height $ho_3$, the third region inner height $hi_3$, the second transition region outer height $ho_{2\sim3}$, and the second transition region inner height $hi_{2\sim3}$ as described above, an impact energy absorption amount with respect to three-point bending deformation of the side sill 1 caused at the time of a side collision can be increased. Even in a case where axial crushing deformation occurs in the side sill 1 at the time of a front collision or a rear collision including a small overlap collision, occurrence of spot breaking can also be suppressed, and accordingly, the impact energy absorption amount with respect to the axial crushing deformation of the side sill 1 can be increased. Hereinafter, the reasons will be described.

As described above, the first region 14 and the third region 18 are required to have excellent axial crushing properties. However, these excellent axial crushing properties are required not only in a case where an input direction of an impact load coincides with a material axis direction (length direction) of the side sill 1 but also in a case where the input direction is a direction inclined, for example, about 10 degrees from this material axis direction.

Figure 2:
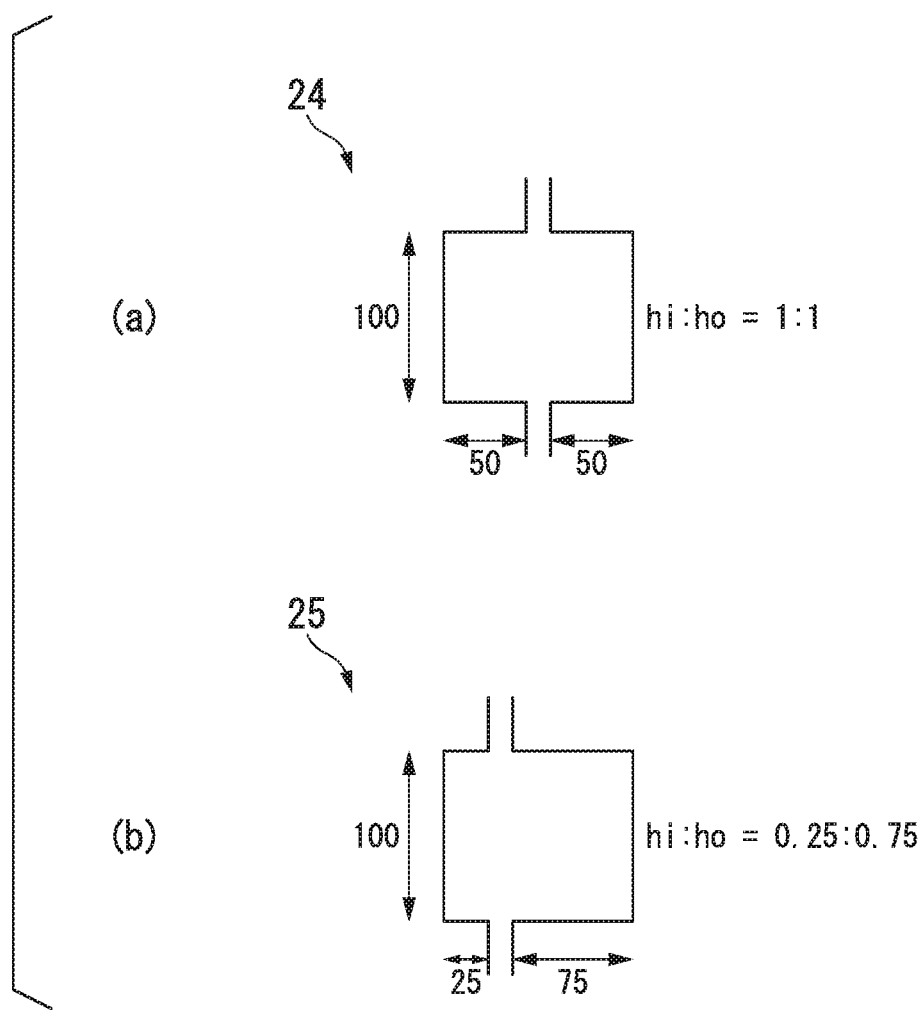
FIG. 2 is an explanatory view schematically illustrating cross-sectional shapes of side sills of a present invention example and a comparative example used for numerical analysis of axial crushing deformation.

FIG. 2(a) and FIG. 2(b) are explanatory views schematically illustrating cross-sectional shapes of a test piece 24 of a side sill of a present invention example, and a test piece 25 of a side sill of a comparative example used for numerical analysis of the axial crushing deformation performed by present inventors. Additionally, FIG. 3(a) to FIG. 3(e) are explanatory views schematically illustrating numerical analysis conditions of the axial crushing deformation.

The present inventors performs a numerical analysis test for the axial crushing deformation in which a front end section of the side sill is supposed as illustrated in FIGS. 3(a) to 3(e), using the test piece 24 of the present invention example in which a ratio of the first region outer height $ho_1$ and the first region inner height $hi_1$ is $ho_1:hi_1=1:1$ and the test piece 25 of the comparative example in which the ratio is $ho_1:hi_1=3:1$, as illustrated in FIG. 2(a) and FIG. 2(b).

In addition, the plate thickness t of the test pieces 24 and 25 was 1.4 mm, the tensile strength thereof was 980 MPa, and the total length thereof was 350 mm. The resistance spot welding was performed at nine points set at intervals of 40 mm in the material axis direction of the test pieces 24 and 25. A welding condition was set such that the nugget diameter of welding nuggets formed by the resistance spot welding became $4\sqrt{t}$ (mm).

In the numerical analysis test for the axial crushing deformation, after lower end portions of the test pieces 24 and 25 were fixed, a flat plate-shaped rigid body 26 was made to collide against upper end portions of the test pieces 24 and 25 in a state where the rigid body was parallel to or inclined at 10° with respect to a width direction of the test pieces 24 and 25. The collision speed of the rigid body 26 against the test pieces 24 and 25 was 20 km/h. Regarding the respective analysis conditions illustrated in FIG. 3(a) to FIG. 3(e), the presence/absence of the spot breaking in a case where the axial crushing deformation was caused within a range of 150 mm in the material axis direction of the test pieces 24 and 25 due to the collision of the rigid body 26 was investigated. Additionally, regarding the respective analysis conditions illustrated in FIG. 3(a) to FIG. 3(e), the impact energy absorbed amount EA (kJ) in a case where the axial crushing deformation was caused within a range of 150 mm in the material axis direction of the test pieces 24 and 25 due to the collision of the rigid body 26 was analyzed.

Figure 4:
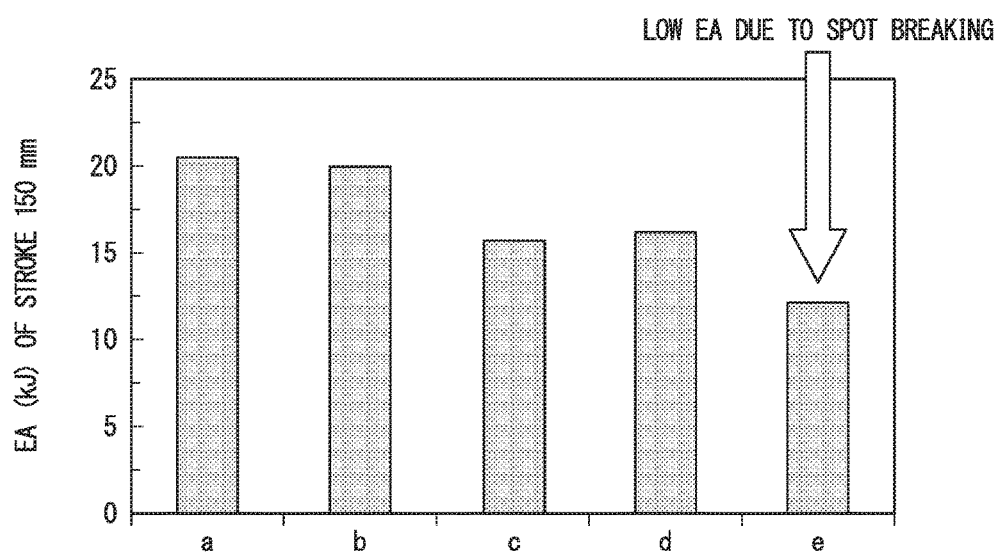
FIG. 4 is a graph illustrating impact energy absorbed amount EA (kJ) that is a numerical analysis result of the axial crushing deformation.

Table 1 shows test results of the presence/absence of the spot breaking. FIG. 4 is a graph illustrating analysis results of the impact energy absorbed amount EA (kJ) with respect to the axial crushing deformation.

TABLE 1

|  | Present Invention Example | | Comparative Example | | |
| --- | --- | --- | --- | --- | --- |
| FIG. 3(a) to FIG. 3(e) | a | b | c | d | e |
| Presence/Absence of Spot Breaking | No | No | No | No | Yes |

Figure 3:
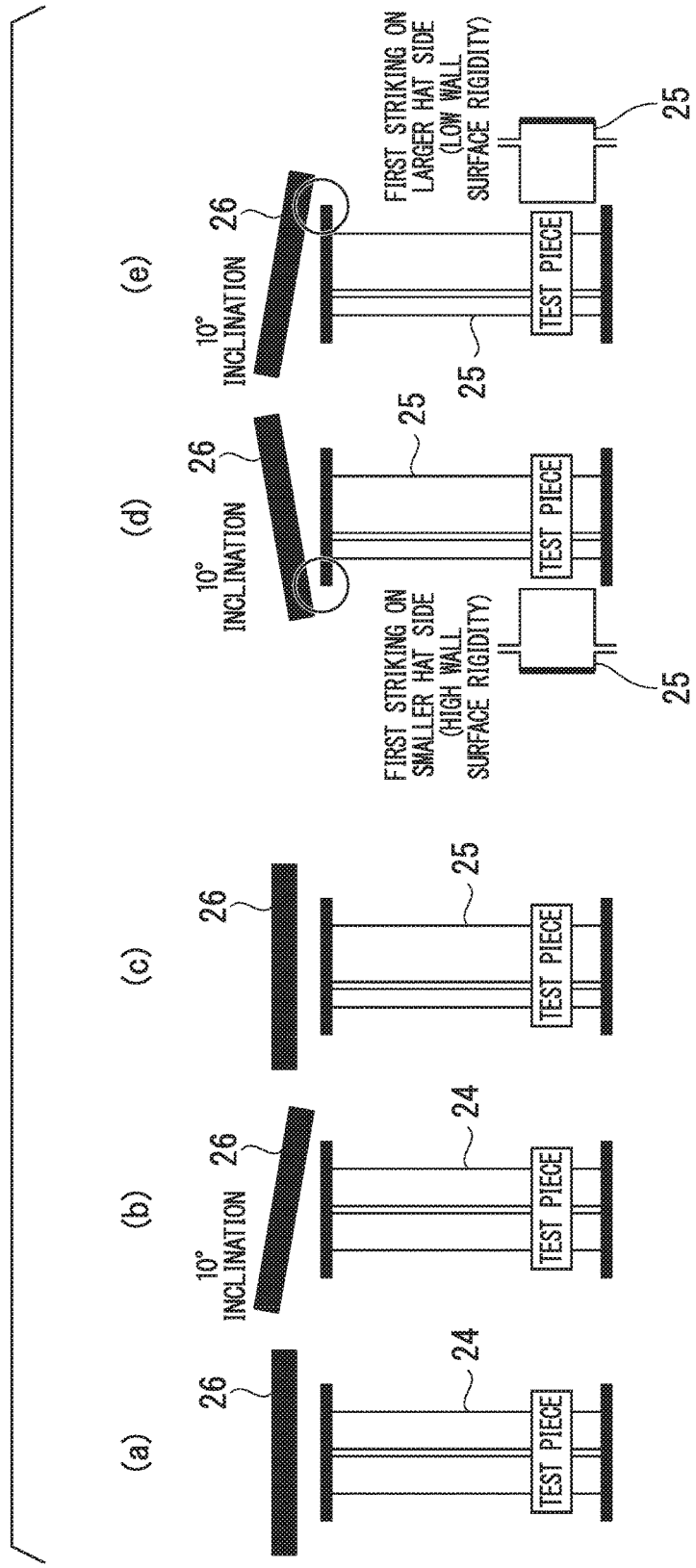
FIG. 3 is an explanatory view schematically illustrating numerical analysis conditions of the axial crushing deformation.

As shown in Table 1 and FIG. 4, in the test piece 25 of the comparative example subjected to testing on the analysis conditions illustrated in FIG. 3(e), the 10°-inclined rigid body 26 collided against a hat-shaped panel closer to a larger hat side (a hat-shaped side sill outer panel of which the height of the side walls was large) than a hat-shaped panel on a smaller hat sill (a hat-shaped side sill inner panel of which the height of the side walls was small). Accordingly, the spot breaking occurred, and consequently, the impact energy absorbed amount EA decreased.

In contrast, in the test piece 24 of the present invention example subjected to testing on the analysis conditions illustrated in FIG. 3(a) and FIG. 3(b), in any of a case where the rigid body 26 was made to collide against the test piece in a state where the rigid body was parallel to the width direction of the test piece 24, and a case where the rigid body 26 was made to collide against the test piece in a state where the rigid body was inclined at 10° with respect to the width direction of the test piece 24, the spot breaking did not occur. As illustrated in such test results, it turned out that the test piece 24 of the present invention example had high robustness with respect to the axial crushing deformation, as compared to the test piece 25 of the comparative example.

The reasons are considered as follows. That is, in the test piece 25 of the comparative example, the height of the side walls of the side sill outer panel (the hat-shaped panel on the larger hat side) is larger than the height of the side walls of the side sill inner panel (the hat-shaped panel on the smaller hat side), the surface rigidity of the side walls is lower than the test piece 24 of the present invention example. For this reason, particularly as illustrated in FIG. 3(e), if an impact load is firstly input to the side sill outer panel having the side walls with low surface rigidity, the side sill outer panel is largely deformed, shear deformation in a welded spot (flange) welded with the side sill inner panel becomes excessive. As a result, the spot breaking occurs at an early stage.

In this way, in the first region 14 and the third region 18 of the side sill 1, the first region outer height $ho_1$, the first region inner height $hi_1$, the third region outer height $ho_3$, and the third region inner height $hi_3$ have constant values, respectively. Accordingly, even if the axial crushing deformation occurs due to an impact load in the first region 14 and the third region 18 of the side sill 1, the occurrence of the spot breaking can be markedly suppressed. As a result, a decrease in the impact energy absorbed amount EA with respect to the axial crushing deformation can be suppressed.

Figure 5:
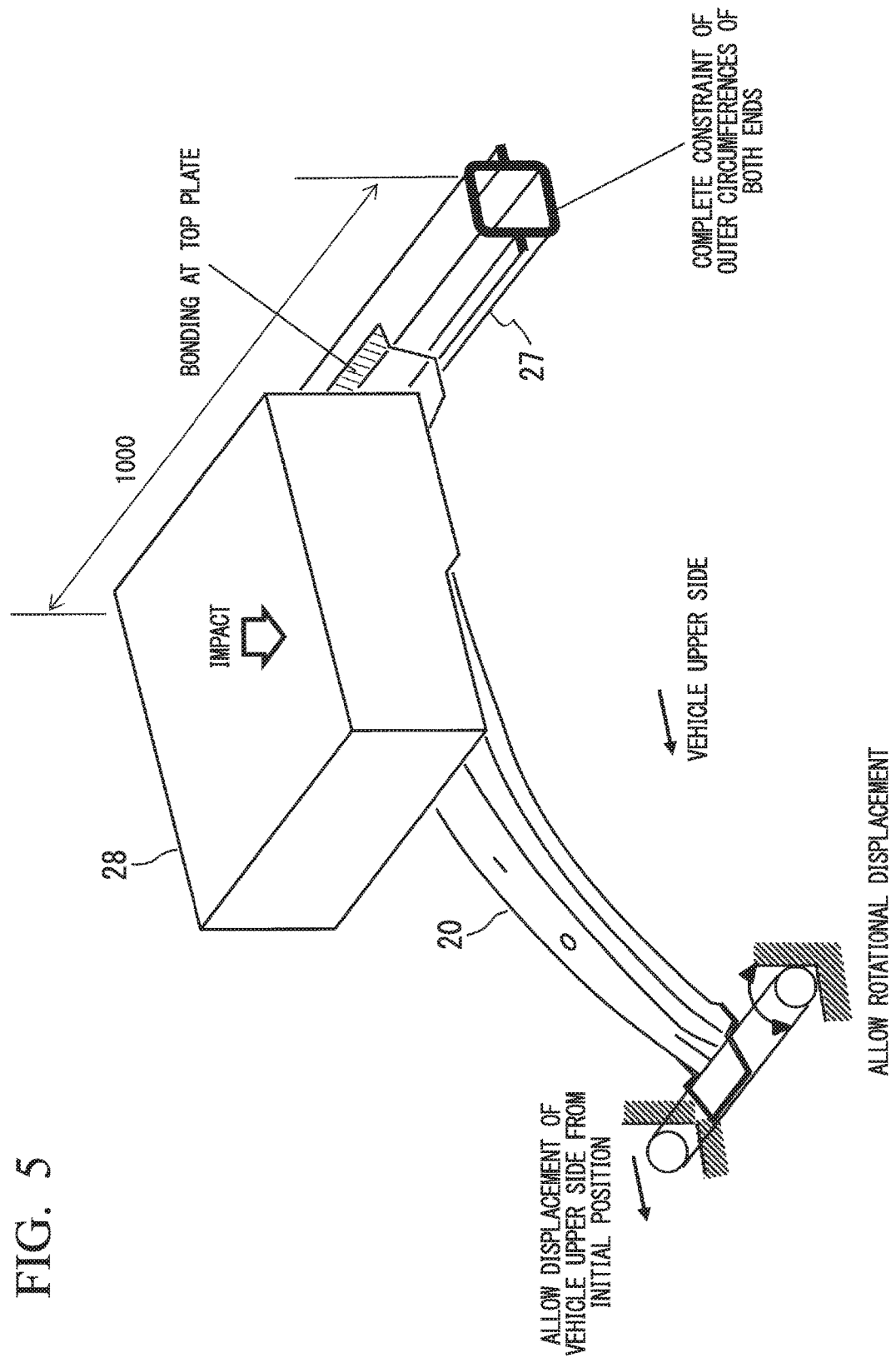
FIG. 5 is an explanatory view illustrating numerical analysis conditions of three-point bending deformation of a side sill adopted in a side collision test in which a case where a side collision has occurred in a B pillar joint portion of the side sill is supposed.
Figure 6:
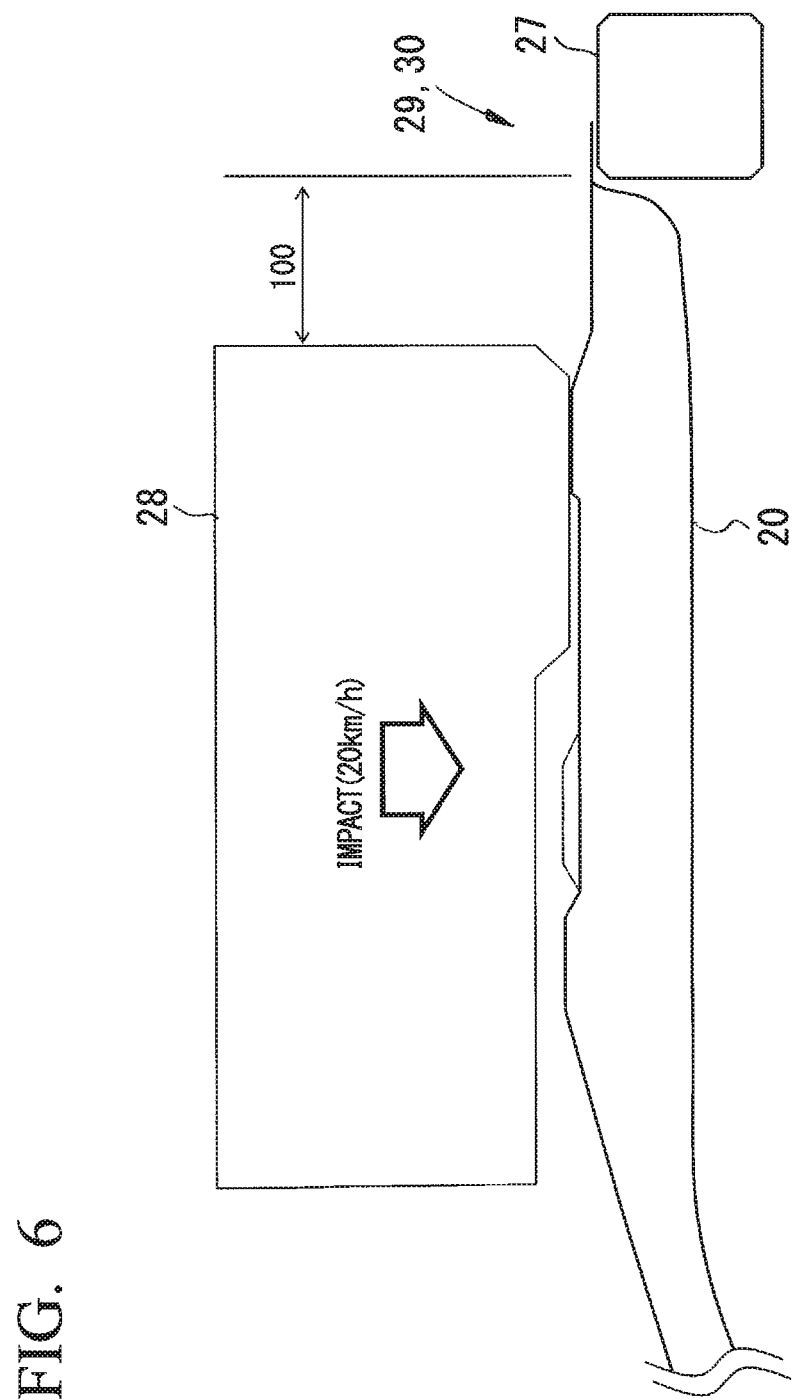
FIG. 6 is an explanatory view illustrating the numerical analysis conditions of the three-point bending deformation of the side sill adopted in the side collision test in which the case where the side collision has occurred in the B pillar joint portion of the side sill is supposed.

FIGS. 5 and 6 are explanatory views illustrating the numerical analysis conditions of the three-point bending deformation of a side sill 27 adopted in a side collision test in which a case where a side collision has occurred in a B pillar joint portion of the side sill is supposed.

Figure 7:
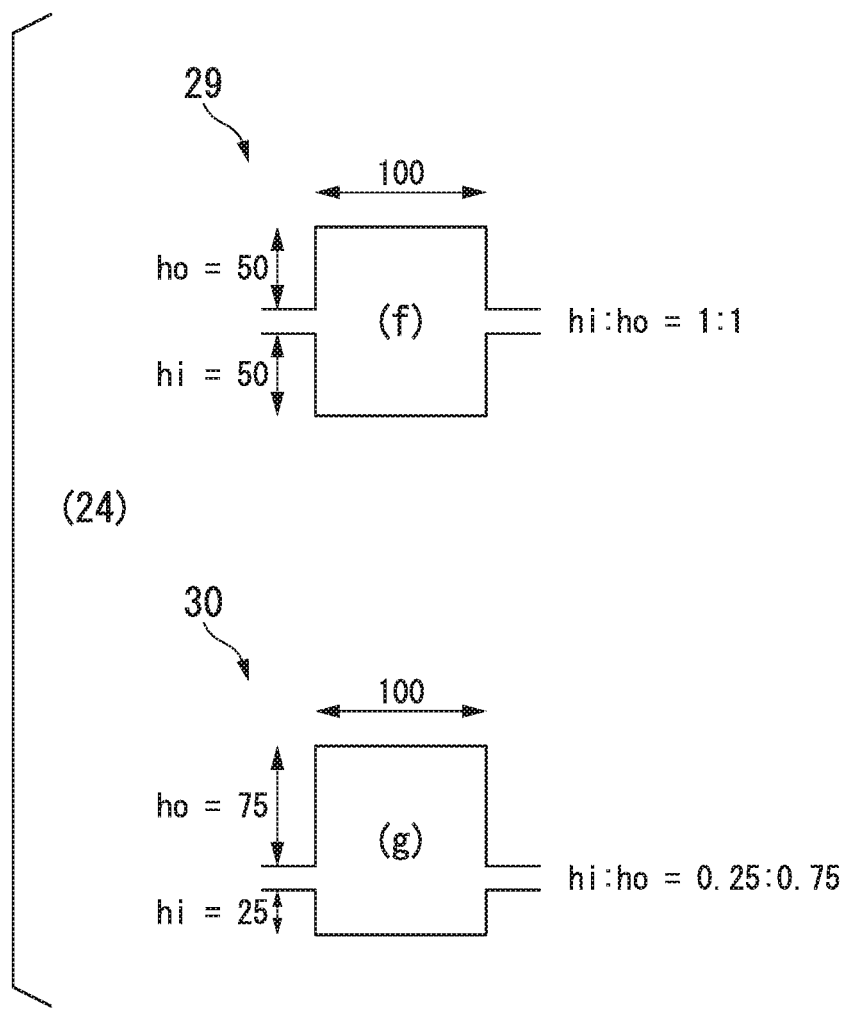
FIG. 7 is an explanatory view illustrating a test piece of a comparative example in which a ratio of heights (a second region outer height $ho_2$ and a second region inner height $hi_2$)

Additionally, FIG. 7 is an explanatory view illustrating a test piece 29 of the comparative example in which a ratio of the second region outer height $ho_2$ and the second region inner height $hi_2$ that is $ho_2:hi_2=1:1$, and a test piece 30 of the present invention example that is $ho_2:hi_2=3:1$.

The plate thickness of the test pieces 29 and 30 was 1.4 mm, and the tensile strength thereof was 980 MPa. The plate thickness of the B pillar 20 was 1.4 mm, and the tensile strength thereof was 590 MPa. The B pillar 20 was joined to a top plate of the side sill 27. Constraint conditions of both ends of the side sill 27 were complete constraint of entire circumferences of both the ends, and constraint conditions of a vehicle upper end of the B pillar 20 was allowance of rotational displacement and allowance of displacement of only a vehicle upper side from an initial position. As illustrated in FIG. 6, a rigid body 28 was made to collide against the horizontally disposed test pieces 29 and 30 at a speed of 20 km/h from above. Regarding the respective test pieces 29 and 30, the impact energy absorbed amount EA (kJ) in case the stroke of the rigid body 28 is 170 mm was analyzed.

FIG. 8 illustrates analysis results of the impact energy absorbed amount EA with respect to the three-point bending deformation analyzed regarding the respective test pieces 29 and 30. As illustrated in FIG. 8, it can be seen that the impact energy absorbed amount EA of the test piece 30 of the present invention example is markedly higher than the impact energy absorbed amount EA of the test piece 29 of the comparative example.

The reasons are considered as follows. That is, if an impact load resulting from a side collision is applied, a bending moment is applied to the side sill outer panel via a joining region joined to the B pillar. If the test piece 29 of the comparative example and the test piece 30 of the present invention example are compared with each other regarding the second region outer height $ho_2$ of the side sill outer panel, the second region outer height $ho_2$ of the test piece 29 of the comparative example is smaller than the second region outer height $ho_2$ of the test piece 30 of the present invention example. For that reason, in a case where a bending moment is applied to the side sill outer panel of the test piece 29 of the comparative example, large deformation occurs in a welded spot (flange) welded with the side sill inner panel. As a result, it is believed that the impact energy absorbed amount EA of the test piece 29 of the comparative example becomes smaller than the impact energy absorbed amount EA of the test piece 30 of the present invention example.

According to the present embodiment based on the above analysis results, the impact energy absorption amount with respect to the three-point bending deformation of the side sill 1 caused at the time of a side collision can be increased. Even in a case where axial crushing deformation occurs in the side sill 1 at the time of a front collision or a rear collision, the occurrence of the spot breaking can also be suppressed. Accordingly, the impact energy absorption amount with respect to the axial crushing deformation of the side sill 1 can be increased.

It is desirable that the first region 14 is a region up to the position that is 150 mm or less apart rearward from the rear end of the lower A pillar connecting portion 21 of the side sill 1. Since the first region 14 is a portion that is within a range close to a passenger's ankle and connected to a lower end portion of the lower A pillar 19 by the resistance spot welding, it is necessary to prevent the spot breaking from occurring in the first region 14 at the time of input of an impact load. For that reason, it is desirable that the region up to the position that is 150 mm or less apart rearward from the rear end of the lower A pillar connecting portion 21 of the side sill 1 is the first region 14.

Additionally, it is desirable that the second region 16 is the region between the position that is 150 mm apart from the B pillar front connecting portion 22 toward the vehicle front and the position that is 150 mm apart from the B pillar rear connecting portion 23 toward the vehicle rear. A lower end portion of the B pillar 20 is fixed to a portion of the second region 16 by the resistance spot welding. However, at the time of a side collision, the three-point bending deformation occurs in the second region 16 in the side walls 11a and 11b of the side sill outer panel 3. In this way, in order to increase resistance with respect to the three-point bending deformation caused in the second region 16 to increase the impact energy absorption amount with respect to the three-point bending deformation, it is desirable that the above region is the second region 16.

In the first region 14, it is preferable to satisfy the following Relational Expression (a).

$$0.40 \times (hi_1 + ho_1) \leq ho_1 \leq 0.60 \times (h_1 + ho_1) \quad \text{(a)}$$

In the second region 16, it is preferable to satisfy the following Relational Expression (b).

$$0.1 \times (hi_2 + ho_2) \leq hi_2 \leq 0.4 \times (hi_2 + ho_2) \quad \text{(b)}$$

In the third region 18, it is preferable to satisfy the following Relational Expression (c).

$$0.40 \times (hi_3 + ho_3) \leq ho_3 \leq 0.60 \times (hi_3 + ho_3) \quad \text{(c)}$$

By satisfying the above Relational Expressions (a) and (c), the occurrence of the spot breaking in the first region 14 and the third region 18 is suppressed even if the axial crushing deformation occurs in the side sill 1 at the time of a front collision or a rear collision. As a result, the impact energy absorption amount with respect to the axial crushing deformation of the side sill 1 increases. Additionally, by satisfying the above Relational Expression (b), the occurrence of the three-point bending deformation in the side sill outer panel 3 at the time of a side collision is suppressed. As a result, the impact energy absorption amount with respect to the three-point bending deformation increases.

As described above, although the side sill 1 equipped with the first region 14, the second region 16, the third region 18, the first transition region 15, and the second transition region 16 has been exemplified in the first embodiment, this side sill may be a side sill equipped with at least the first region 14, the second region 16, and the first transition region 15. For example, the rear end portion may be included in the second region 16.

FIG. 9A is an explanatory view illustrating a first modification example of a mating structure of the joint portions of the side sill inner panel 2 and the side sill outer panel 3. FIG. 9B is an explanatory view illustrating a second modification example of a mating structure of the joint portions of the side sill inner panel 2 and the side sill outer panel 3.

As illustrated in FIG. 9A, in a side sill 1-1 of the first modification example, in at least portions of the joint portions, and the flange width of the outward flanges 13a and 13b is set to be longer than the flange width of the outward flanges 8a and 8b. The outward flanges 13a and 13b are bent by hemming working (hemming work) so as to cover the outward flanges 8a and 8b. For example, an effect of suppressing the spot breaking at the time of the occurrence of the axial crushing deformation is improved by adopting the above configuration in the first region 14 or the third region 18.

In addition, the flange width of the outward flanges 8a and 8b may be set to be longer than the flange width of the outward flanges 13a and 13b, and the outward flanges 8a and 8b may be bent by the hemming working so as to cover the outward flanges 13a and 13b.

As illustrated in FIG. 9B, in a side sill 1-2 of the second modification example, in at least portions of the joint portions, the outward flanges 8a and 8b are not provided in the side sill inner panel 2, and the outward flanges 13a and 13b are not provided in the side sill outer panel 3. The edge portions of the two side walls 6a and 6b of the side sill inner panel 2 and edge portions of two side walls 13a and 13b of the side sill outer panel 3 are joined to each other in an overlapped state. For example, an effect of suppressing the spot breaking at the time of the occurrence of the axial crushing deformation is improved by adopting the above configuration in the first region 14 or the third region 18.

Second Embodiment

Next, a second embodiment of the invention will be described. In the second embodiment, a frontside member that is a skeleton member of the automobile vehicle body is exemplified as an automobile member related to the invention. This frontside member has a frontside member inner panel as an inner panel and has a frontside member outer panel as an outer panel.

FIG. 10 is a perspective view illustrating a schematic configuration of a frontside member 31 related to the second embodiment of the invention. FIG. 11 is a top view partially illustrating an arrangement situation of the frontside member 31 in a simplified manner. A B-B cross section and a C-C cross section are altogether illustrated in FIG. 11.

The frontside member 31 has at least a frontside member inner panel 32 and a frontside member outer panel 33. The frontside member inner panel 32 and the frontside member outer panel 33 are respectively shape steels formed from high-tensile steel sheets having a plate thickness of 1.0 mm or more. A reinforcement (reinforcing plate) may be provided between the frontside member inner panel 32 and the frontside member outer panel 33.

The frontside member inner panel 32 has at least the top plate 4 and the two side walls 6a and 6b connected to the top plate 4. Since the frontside member inner panel 32 is formed and manufactured by the press working using the ordinary bending forming or throttle forming or the roll working using the bending forming, the frontside member inner panel 32 has the ridgelines 5a and 5b connected to the top plate 4 and the side walls 6a and 6b.

Additionally, edge portions of the frontside member inner panel 32 are provided with the outward flanges 8a and 8b connected to the two side walls 6a and 6b. The outward flanges 8a and 8b are joining margins joined by, for example, the resistance spot welding or the like in a state where the outward flanges 8a and 8b are overlapped on outward flanges 13a and 13b provided at edge portions of the frontside member outer panel 33. For this reason, the frontside member inner panel 32 further has the curved portions 7a and 7b connected to the side walls 6a and 6b and the outward flanges 8a and 8b.

The respective curvature radii of the ridgelines 5a and 5b and the curved portions 7a and 7b are values such that manufacture is performed by the above-described ordinary working methods, and are usually 3 to 20 mm.

Meanwhile, the frontside member outer panel 33 has at least the top plate 9, and two side walls 11a and 11b connected to the top plate 9, similar to the frontside member inner panel 32. Since the frontside member outer panel 33 is manufactured by the press working using the ordinary bending forming or throttle forming or the roll working using the bending forming, the frontside member outer panel 33 has the ridgelines 10a and 10b connected to the top plate 9 and the side walls 11a and 11b.

Additionally, the edge portions of the frontside member outer panel 33 are provided with the outward flanges 13a and 13b connected to the two side walls 11a and 11b. The outward flanges 13a and 13b are the joining margins joined by, for example, the resistance spot welding or the like in a state where the outward flanges 13a and 13b are overlapped on the outward flanges 8a and 8b provided at the edge portions of the frontside member inner panel 32. For this reason, the frontside member outer panel 33 further has the curved portions 12a and 12b connected to the side walls 11a and 1 lb and the outward flanges 13a and 13b.

The respective curvature radii of the ridgelines 10a and 10b and the curved portions 12a and 12b are values such that manufacture is performed by the above-described ordinary working methods, and are usually 3 to 20 mm.

Although a case where the outward flanges 8a and 8b are joined to the outward flanges 13a and 13b by the resistance spot welding has been exemplified in the above description, for example, it is also possible to use other joining methods, such as other kinds of welding such as laser welding or electric arc welding other than the resistance spot welding, bonding, and brazing.

The frontside member 31 has the first region 14, the first transition region 15, and the second region 16.

The first region 14 extends rearward from a front end portion 31a of the frontside member 31. The first transition region 15 extends rearward continuously with the first region 14. Moreover, the second region 16 extends rearward continuously with the first transition region 15.

In the following, the height of the side walls 11a and 11b of the frontside member outer panel 33 in the first region 14 is defined as the first region outer height $ho_b$ and the height of the side walls 6a and 6b of the frontside member inner panel 32 in the first region 14 is defined as the first region inner height $hi_1$.

The height of the side walls 11a and 11b of the frontside member outer panel 33 in the second region 16 is defined as the second region outer height $ho_2$, and the height of the side walls 6a and 6b of the frontside member inner panel 32 in the second region 16 is defined as the second region inner height $hi_2$. The height of the side walls 11a and 11b of the frontside member outer panel 33 in the first transition region 15 is defined as the first transition region outer height $ho_{1\sim2}$, and the height of the side walls 6a and 6b of the frontside member inner panel 32 in the first transition region 15 is defined as the first transition region inner height $hi_{1\sim2}$.

In the first region 14, the first region outer height $ho_1$ and the first region inner height $hi_1$ have the constant values, and the difference between the first region outer height $ho_1$ and the first region inner height $hi_1$ is smaller than the difference between the second region outer height $ho_2$ and the second region inner height $hi_2$. In the frontside member 31 illustrated in FIG. 10, the first region outer height $ho_1$ and the first region inner height $hi_1$ are substantially equal to each other.

In this way, in the first region 14 located on a front end side of the frontside member 31, the first region outer height $ho_1$ and the first region inner height $hi_1$ are substantially equal to each other. Therefore, as described in the first embodiment, the occurrence of the spot breaking at the time of a front collision can be suppressed.

In the second region 16, the second region outer height $ho_2$ has a constant value smaller than the second region inner height $hi_2$. In the frontside member 31 illustrated in FIG. 10, the second region outer height $ho_2$ is zero. That is, in the second region 16, the side walls 11a and 11b of the frontside member outer panel 33 are not present.

In the first transition region 15, the first transition region outer height $ho_{1\sim2}$ continuously varies between the first region outer height $ho_1$ and the second region outer height $ho_2$, and the first transition region inner height $hi_{1\sim2}$ continuously varies between the first region inner height $hi_1$ and the second region inner height $hi_2$.

An engine mount bracket 46 that supports a transverse-mounted engine 44 is fixed to the side wall 6a of the frontside member inner panel 32 in the second region 16. In the second region 16, the side walls 11a and 11b of the frontside member outer panel 33 are not present. Thus, the height (second region inner height $hi_2$) of the side walls 6a and 6b of the frontside member inner panel 32 is sufficiently secured. For this reason, since the mountability of the engine mount bracket 46 is sufficiently secured, and as illustrated in FIG. 17, the frontside member 31 bends to a vehicle inside at the time of a front collision, the impact energy absorption amount can be increased.

For this reason, the first region 14 and the second region 16 are formed nearer the front end portion 31a of the frontside member 31 than a mounting position of the engine mount bracket 46.

As described above, by setting the first region outer height $ho_1$, the first region inner height $hi_1$, the second region outer height $ho_2$, the second region inner height $hi_2$, the first transition region outer height $ho_{1\sim2}$, and the first transition region inner height $hi_{1\sim2}$, the mountability of the engine mount bracket 46 can be maintained, and the occurrence of the spot breaking at the time of a front collision can be suppressed.

In the first region 14, it is preferable to satisfy the following Relational Expression (a). Accordingly, since the occurrence of the spot breaking is suppressed even in a case where the axial crushing deformation occurs in the frontside member 31 at the time of a front collision or a rear collision, the impact energy absorption amount with respect to the axial crushing deformation increases.

$$0.40 \times (hi_1 + ho_1) \leq ho_1 \leq 0.60 \times (hi_1 + ho_1) \quad (a)$$

It is desirable that the first region 14 is a region between the front end portion 31a of the frontside member 31 and a position that is 400 mm or less apart rearward from the front end portion 31a. Accordingly, it is possible to avoid that the spot breaking occurs in a welded spot between the outward flanges 8a and 13a. As a result, a decrease in the impact energy absorption amount can be avoided.

It is desirable that the second region 16 is a region that is present behind a position that is 150 mm or more apart from the front end portion 31a. Accordingly, not only the engine 44 can be effectively mounted but also the frontside member 31 can be effectively folded at the time of a collision and the impact energy absorption amount can be improved.

Moreover, in the second region 16, it is desirable to satisfy the following Relational Expression (d) or Relational Expression (e). Accordingly, not only the engine 44 can be effectively mounted but also the frontside member 31 can be effectively folded at the time of a collision and the impact energy absorption amount can be improved.

$$0 \leq hi_2 \leq 0.40 \times (hi_2 + ho_2) \quad (d)$$

$$0 \leq ho_2 \leq 0.40 \times (hi_2 + ho_2) \quad (e)$$

Moreover, similar to the first embodiment, the mating structure of the joint portion of the frontside member 31 may be the same structure as the modification example described referring to FIGS. 9A and 9B.

A case where the outward flanges 8a and 8b of the frontside member inner panel 32 and the outward flanges 13a and 13b of the frontside member outer panel 33 are disposed on a vehicle outside in the second region 16 has been exemplified in the above description. However, in a case where the outward flanges 8a, 8b, 13a, and 13b are disposed on the vehicle inside, an engine mount bracket having a shape that reaches the side walls over the outward flanges 8a, 8b, 13a, and 13b may be used.

Third Embodiment

Next, a third embodiment of the invention will be described. In the third embodiment, a side sill that is a skeleton member of an automobile vehicle body is exemplified as an automobile member related to the invention. This side sill has a side sill inner panel as an inner panel and has a side sill outer panel as an outer panel.

FIG. 12A is a plan view of a side sill 100 related to the third embodiment of the invention. FIG. 12B is an E-E arrow cross-sectional view of the side sill 100 illustrated in FIG. 12A. As illustrated in FIGS. 12A and 12B, the side sill 100 has a side sill outer panel 110 and a side sill inner panel 120. The side sill outer panel 110 and the side sill inner panel 120 are hat-shaped steels formed from high-tensile steel sheets.

The side sill outer panel 110 has a top plate 111, a pair of side walls 112 and 113, and a pair of outward flanges 114 and 115. The top plate Ill, the side walls 112 and 113, and the outward flanges 114 and 115 are rectangular flat plates extending in a material axis direction (length direction) of the side sill 100, respectively.

As illustrated in FIG. 12B, when the side sill 100 is seen in a cross section orthogonal to the material axis direction, one width-direction end portion of the side wall 112 is connected to one width-direction end portion of the top plate 111 such that an angle between the top plate 111 and the side wall 112 becomes substantially right-angled. Similarly, one width-direction end portion of the side wall 113 is connected to the other width-direction end portion of the top plate 111 such that an angle between the top plate 111 and the side wall 113 becomes substantially right-angled.

In addition, in a case where the side sill outer panel 110 is formed by press-working one steel sheet, the ridgelines described in the first embodiment are present at a connecting site between the top plate 111 and the side wall 112 and at a connecting site between the top plate 111 and the side wall 113, but the illustration thereof is omitted in FIG. 12B.

Additionally, as illustrated in FIG. 12B, when the side sill 100 is seen in the section orthogonal to the material axis direction, an angle between the side wall 112 and the outward flange 114 becomes substantially right-angled and the outward flange 114, and one width-direction end portion of the outward flange 114 is connected to the other width-direction end portion of the side wall 112 so as to protrude toward the outside of the side sill 100 from the side wall 112.

Similarly, an angle between the side wall 113 and the outward flange 115 becomes substantially right-angled, and one width-direction end portion of the outward flange 115 is connected to the other width-direction end portion of the side wall 113 such that the outward flange 115 protrudes toward the outside of the side sill 100 from the side wall 113.

In addition, in a case where the side sill outer panel 110 is formed by press-working one steel sheet, the curved portions described in the first embodiment are present at a connecting site between the side wall 112 and the outward flange 114 and a connecting site between the side wall 113 and the outward flange 115, but the Illustration thereof is omitted in FIG. 12B.

The length of the side walls 112 and 113 and the length of the outward flanges 114 and 115 are the same as the length of the top plate 111. The width (equivalent to "the height of the side walls" described in the first embodiment) of the side wall 112 is the same as the width of the side wall 113. The width of the outward flange 114 is the same as the width of the outward flange 115.

The side sill inner panel 120 has a top plate 121, a pair of side walls 122 and 123, and a pair of outward flanges 124 and 125. The top plate 121, the side walls 122 and 123, and the outward flanges 124 and 125 are rectangular flat plates extending in the material axis direction of the side sill 100, respectively.

As illustrated in FIG. 12B, when the side sill 100 is seen in the section orthogonal to the material axis direction, the top plate 121 faces the top plate 111. The length and width of the top plate 121 are the same as the length and width of the top plate 111. One width-direction end portion of the side wall 122 is connected to one width-direction end portion of the top plate 121 such that an angle between the top plate 121 and the side wall 122 becomes substantially right-angled. Similarly, one width-direction end portion of the side wall 123 is connected to the other width-direction end portion of the top plate 121 such that an angle between the top plate 121 and the side wall 123 becomes substantially right-angled.

In addition, in a case where the side sill inner panel 120 is formed by press-working one steel sheet, the ridgelines described in the first embodiment is present are at a connecting site between the top plate 121 and the side wall 122 and at a connecting site between the top plate 121 and the side wall 123, but the illustration thereof is omitted in FIG. 12B.

Additionally, as illustrated in FIG. 12B, when the side sill 100 is seen in the section orthogonal to the material axis direction, an angle between the side wall 122 and the outward flange 124 becomes substantially right-angled and the outward flange 124, and one width-direction end portion of the outward flange 124 is connected to the other width-direction end portion of the side wall 122 so as to protrude toward the outside of the side sill 100 from the side wall 122.

Similarly, an angle between the side wall 123 and the outward flange 125 becomes substantially right-angled, and one width-direction end portion of the outward flange 125 is connected to the other width-direction end portion of the side wall 123 such that the outward flange 125 protrudes toward the outside of the side sill 100 from the side wall 123.

In addition, in a case where the side sill inner panel 120 is formed by press-working one steel sheet, the curved portions described in the first embodiment are present at a connecting site between the side wall 123 and the outward flange 124 and a connecting site between the side wall 122 and the outward flange 125, but the illustration thereof is omitted in FIG. 12B.

The length of the side walls 122 and 123 and the length of the outward flanges 124 and 125 are the same as the length of the top plate 121. The width of the side wall 122 is the same as the width of the side wall 123. The width of the outward flange 124 is the same as the width of the outward flange 125. The width of the outward flanges 124 and 125 is the same as the width of the outward flanges 114 and 115.

As described above, the side sill outer panel 110 and the side sill inner panel 120 have a hat-shaped cross-sectional shape, respectively. The outward flanges 114 and 115 of the side sill outer panel 110 and the outward flanges 124 and 125 of the side sill inner panel 120 are joined to each other by the resistance spot welding or the like in an overlapped state.

In the following, the height (width) of the side walls 112 and 113 of the side sill outer panel 110 is defined as the outer height ho, and the height (width) of the side walls 122 and 123 of the side sill inner panel 120 is defined as the inner height hi.

Additionally, the tensile strength of the side sill outer panel 110 is defined as TSo (MPa) and the plate thickness thereof is defined as to (mm), and the tensile strength of the side sill inner panel 120 is defined as TSi (MPa) and the plate thickness thereof is defined as ti (mm).

In the side sill 100 of the third embodiment, the outer height ho and the inner height hi have constant values, respectively, in the length direction of the side sill 100, and the outer height ho is larger than the inner height hi. In such the side sill 100, the tensile strength TSo and the plate thickness to of the side sill outer panel 110, and the tensile strength TSi and the plate thickness ti of the side sill inner panel 120 are set so as to satisfy the following Relational Expression (f).

$$TSo \times to < TSi \times ti \quad (1)$$

According to the side sill 100 of the third embodiment having the above configuration, both the impact energy absorption amount with respect to the axial crushing deformation and the impact energy absorption amount with respect to the three-point bending deformation can be increased similar to the side sill 1 of the first embodiment. Hereinafter, the reasons will be described.

As illustrated in FIG. 13A, a test piece 200 that imitated the side sill 100 of the third embodiment was prepared, and an analysis test for the axial crushing deformation was performed similar to the first embodiment. That is in this test, after a lower end portion of the test piece 200 was fixed, a flat plate-shaped rigid body 300 was made to collide against an upper end portion of the test piece 200 in a state where the rigid body was parallel to or inclined at 10° with respect to a width direction of the test piece 200. Here, the inclined state of the rigid body 300 was adjusted such that the rigid body 300 firstly collide against a hat-shaped panel closer to a larger hat side (a hat-shaped side sill outer panel of which the height of the side walls was large) rather than a hat-shaped panel 220 (a side sill inner panel of which the height of the side walls was small) on a smaller hat side. The collision speed of the rigid body 300 against the test piece 200 was 20 km/h.

Under the conditions in which the tensile strength TSi of the hat-shaped panel 220 on the smaller hat side (side sill inner panel) was fixed at 780 (MPa) and the plate thickness ti was fixed at 1.4 (mm), the combination of the tensile strength TSo and the plate thickness to of the hat-shaped panel 210 on the larger hat side (side sill outer panel) was set according to combinations illustrated in Table 2. The rigid body 300 was made to collide against to the test piece 200 in which the combinations illustrated in Table 2 were adopted, on the above collision conditions, and the presence/absence of the spot breaking was investigated.

The investigation results of the presence/absence of the spot breaking are illustrated in Table 2. Additionally, FIG. 13B is a view graphing a correspondence relationship between a multiplication value (TSo×to) of the tensile strength TSo and the plate thickness to of the hat-shaped panel 210 on the larger hat side (side sill outer panel), and the plate thickness to, on the basis of Table 2.

TABLE 2

| Tensile Strength on | Plate Thickness on Large Hat side (mm) | | | | | | |
|---|---|---|---|---|---|---|---|
| Larger Hat Side | 2.0 | 1.8 | 1.6 | 1.4 | 1.2 | 1.0 | 0.8 |
| 590 (MPa) | Yes | No | No | No | No | No | No |
| 780 (MPa) | Yes | Yes | Yes | Yes | No | No | No |
| 980 (MPa) | Yes | Yes | Yes | Yes | Yes | No | No |

As illustrated in FIG. 13B, in a case where the multiplication value (TSo×to) of the tensile strength TSo and the plate thickness to of the hat-shaped panel 210 on the larger hat side (side sill outer panel) was equal to or larger than a multiplication value (fixed at TSi×ti=1092 (MPa·mm)) of the tensile strength TSi and the plate thickness ti of the hat-shaped panel 220 on the smaller hat side (side sill inner panel), it turned out that the spot breaking occurs and the impact energy absorbed amount EA with respect to the axial crushing deformation decreases.

On the other hand, in a case where the multiplication value (TSo×to) of the tensile strength TSo and the plate thickness to of the hat-shaped panel 210 on the larger hat side (side sill outer panel) was smaller than a multiplication value (fixed at TSi×ti=1092 (MPa·mm)) of the tensile strength TSi and the plate thickness ti of the hat-shaped panel 220 on the smaller hat side (side sill inner panel), it turned out that the spot breaking does not occur and the impact energy absorbed amount EA with respect to the axial crushing deformation does not decrease.

From the above analysis results, in a case where the outer height ho of the side sill 100 is larger than the inner height hi, the tensile strength TSo and the plate thickness to of the side sill outer panel 110 and the tensile strength TSi and the plate thickness ti of the side sill inner panel 120 are set so as to satisfy the above Relational Expression (f). Accordingly, the occurrence of the spot breaking can be suppressed even in a case where the axial crushing deformation occurs in the side sill 100 at the time of a front collision or a rear collision including a small overlap collision. As a result, the impact energy absorption amount that with respect to the axial crushing deformation of the side sill 100 can be increased.

Additionally, the configuration of the side sill 100 is the same as the configuration of the second region 16 of the side sill 1 in the first embodiment. Thus, according to the side sill 100, the impact energy absorption amount with respect to the three-point bending deformation occurring at the time of a side collision can also be increased.

In addition, a case where the outer height ho and the inner height hi have constant values, respectively, in the length direction of the side sill 100 and the outer height ho is larger than the inner height hi has been exemplified in the above third embodiment. However, for example, in a case where the outer height ho and the inner height hi have constant values, respectively, in the length direction of the side sill and the outer height ho is smaller than the inner height hi, the tensile strength TSo and the plate thickness to of the side sill outer panel and the tensile strength TSi and the plate thickness ti of the side sill inner panel may be set so as to satisfy the following Relational Expression (g).

$$TSo \times to > TSi \times ti \quad (g)$$

Additionally, in the above third embodiment, the side sill 100 is exemplified as an automobile member. However, the automobile member may be a frontside member. In this case, the frontside member has a frontside member outer panel of the same configuration as the above side sill outer panel 110 as an outer panel, and has a frontside member inner panel of the same configuration as the above side sill inner panel 120 as an inner panel.

Fourth Embodiment

FIG. 14 is a plan view illustrating a schematic configuration of a side sill 1A related to a fourth embodiment of the invention. The side sill 1A related to a fourth embodiment is equipped with the side sill inner panel 2 and the side sill outer panel 3 having the same configurations as the first embodiment. For that reason, in the following, only differences from the configuration of the side sill 1 of the first embodiment in the configuration of the side sill 1A of the fourth embodiment will be described.

Additionally, in the following, in the side sill 1A, the tensile strength of the side sill outer panel 3 is defined as TSo (MPa) and the plate thickness thereof is defined as to (mm), and the tensile strength of the side sill inner panel 2 is defined as TSi (MPa) and the plate thickness thereof is defined as ti (mm).

As illustrated in FIG. 14, similar to the side sill 1 of the first embodiment, also in the side sill 1A, the second region outer height ho₂ is larger than the second region inner height hi₂. In such the side sill 1A, the tensile strength TSo and the plate thickness to of the side sill outer panel 3, and the tensile strength TSi and the plate thickness ti of the side sill inner panel 2 are set so as to satisfy the following Relational Expression (1).

$$TSo \times to \quad TSi \times ti \quad (f)$$

According to the side sill 1A of the fourth embodiment having the above configuration, the features of both the first embodiment and the third embodiment are included. Thus, by virtue of synergistic effects of the features, the impact energy absorption amount with respect to the three-point bending deformation and the axial crushing deformation can be more effectively increased.

Fifth Embodiment

FIG. 15 is a plan view illustrating a schematic configuration of a frontside member 31A related to a fifth embodiment of the invention. The frontside member 31A related to the fifth embodiment is equipped with the frontside member inner panel 32 and the frontside member outer panel 33 having the same configuration as the second embodiment. For that reason, in the following, only differences from the configuration of the frontside member 31 of the second embodiment in the configuration of the frontside member 31A of the fifth embodiment will be described.

Additionally, in the following, in the frontside member 31A, the tensile strength of the frontside member outer panel 33 is defined as TSo (MPa) and the plate thickness thereof is defined as to (mm), and the tensile strength of the frontside member inner panel 32 is defined as TSi (MPa) and the plate thickness thereof is defined as ti (mm).

As illustrated in FIG. 15, similar to the frontside member 31 of the second embodiment, also in the frontside member 31A, the second region outer height ho₂ is smaller than the second region inner height hi₂. In such the frontside member 31A, the tensile strength TSo and the plate thickness to of the frontside member outer panel 33, and the tensile strength TSi and the plate thickness ti of the frontside member inner panel 32 are set so as to satisfy the following Relational Expression (g).

$$TSo \times to > TSi \times ti \quad (g)$$

According to the frontside member 31A of the fifth embodiment having the above configuration, the features of both the second embodiment and the third embodiment are included. Thus, the occurrence of the spot breaking at the time of a front collision can be more effectively suppressed while maintaining the mountability of the engine mount bracket.

Although the first to fifth embodiments of the invention have been described above, the automobile members (the side sills and the frontside members) described in the respective embodiments may be formed of a tailored welding blank (TWB) in which two or more types of steel sheets having different plate thicknesses, tensile strengths, and the like in a material state are integrated with each other by welding (for example, butt welding), a tailored rolled blank (TRB) in which the plate thickness of a material is changed by changing the intervals of rolling rolls when manufacturing the material, or a combination of the TWB and the TRB.

BRIEF DESCRIPTION OF THE REFERENCE SYMBOLS 1, 1A: SIDE SILL
2: SIDE SILL INNER PANEL
3: SIDE SILL OUTER PANEL
6a, 6b: SIDE WALL
11a, 11b: SIDE WALL
14: FIRST REGION
15: FIRST TRANSITION REGION
16: SECOND REGION

17: SECOND TRANSITION REGION
18: THIRD REGION
19: LOWER A PILLAR
20: B PILLAR
21: REAR WHEEL HOUSING OUTER
31, 31A: FRONTSIDE MEMBER
32: FRONTSIDE MEMBER INNER PANEL
33: FRONTSIDE MEMBER OUTER PANEL
44: TRANSVERSE-MOUNTED ENGINE
46: ENGINE MOUNT BRACKET
100: SIDE SILL
110: SIDE SILL OUTER PANEL
120: SIDE SILL INNER PANEL
111, 121: TOP PLATE
112, 113: SIDE WALL
122, 123: SIDE WALL

The invention claimed is:

1. An automobile member of a closed cross section including an inner panel having a top plate and two side walls connected to the top plate, an outer panel having a top plate and two side walls connected to the top plate, and joint portions in which edge portions of the two side walls of the inner panel are respectively joined to edge portions of the two side walls of the outer panel, the automobile member comprising:
a first region extending rearward from a front end portion of the automobile member;
a first transition region extending rearward continuously with the first region; and
a second region extending rearward continuously with the first transition region,
wherein:
when the height of the side walls of the outer panel in the first region is defined as a first region outer height $ho_1$; the height of the side walls of the inner panel in the first region is defined as a first region inner height $hi_1$; the height of the side walls of the outer panel in the second region is defined as a second region outer height $ho_2$; the height of the side walls of the inner panel in the second region is defined as a second region inner height $hi_2$; the height of the side walls of the outer panel in the first transition region is defined as a first transition region outer height $ho_{1\text{-}2}$; and the height of the side walls of the inner panel in the first transition region is defined as a first transition region inner height $hi_{1\text{-}2}$,
in the first region, the first region outer height $ho_1$ and the first region inner height $hi$ have constant values, and a difference between the first region outer height $ho_1$ and the first region inner height $hi_1$ is smaller than a difference between the second region outer height $ho_2$ and the second region inner height $hi_2$,
in the second region, the second region outer height $ho_2$ has a constant value larger than the second region inner height $hi_2$, or the second region outer height $ho_2$ has a constant value smaller than the second region inner height $hi_2$,
in the first transition region, the first transition region outer height $ho_{1\text{-}2}$ continuously varies between the first region outer height $ho_1$ and the second region outer height $ho_2$, and the first transition region inner height $hi_{1\text{-}2}$ continuously varies between the first region inner height hit and the second region inner height $hi_2$,
the automobile member is a skeleton member of an automobile vehicle body,
the inner panel is a side sill inner panel, the outer panel is a side sill outer panel, and the skeleton member is a side sill,
a lower A pillar connecting portion that is a site to which a lower A pillar is connected is provided in a region including the front end portion in the first region, and a B pillar connecting portion that is a site to which a B pillar is connected is provided in at least a portion of the second region,
the first region is a region to a position that is 150 mm or less apart rearward from a rear end of the lower A pillar connecting portion of the skeleton member, and
the second region is a region between a position that is 150 mm or less apart forward from the B pillar connecting portion, and a position that is 150 mm or less apart rearward from the B pillar connecting portion.

2. The automobile member according to claim 1, wherein the following Relational Expression (a) is satisfied in the first region, and the following Relational Expression (b) is satisfied in the second region, $$0.40 \times (hi_1 + ho_1) \leq ho_1 \leq 0.60 \times (hi_1 + ho_1) \tag{a}$$

$$0.10 \times (hi_2 + ho_2) \leq hi_2 \leq 0.40 \times (hi_2 + ho_2) \tag{b}$$

3. The automobile member according to claim 1, further comprising:
a second transition region extending rearward continuously with the second region; and
a third region extending to a rear end portion of the automobile member rearward continuously with the second transition region,
wherein when the height of the side walls of the outer panel in the third region is defined as a third region outer height $ho_3$; the height of the side walls of the inner panel in the third region is defined as a third region inner height $hi_3$; the height of the side walls of the outer panel in the second transition region is defined as a second transition region outer height $ho_{2\text{-}3}$; and the height of the side walls of the inner panel in the second transition region is defined as the second transition region inner height $hi_{2\text{-}3}$,
in the third region, the third region outer height $ho_3$ and the third region inner height $hi_3$ have constant values, and a difference between the third region outer height $ho_3$ and the third region inner height $hi_3$ is smaller than a difference between the second region outer height hoe and the second region inner height $hi_2$, and
in the second transition region, the second transition region outer height $ho_{2\text{-}3}$ continuously varies between the second region outer height hoe and the third region outer height $ho_3$, and the second transition region inner height $hi_{2\text{-}3}$ continuously varies between the second region inner height $hi_2$ and the third region inner height $hi_3$.

4. The automobile member according to claim 3, wherein the following Relational Expression (c) is satisfied in the third region, $$0.40 \times (hi_3 + ho_3) \leq ho_3 \leq 0.60 \times (hi_3 + ho_3) \tag{c}$$

5. The automobile member according to claim 1, wherein the lower A pillar is connected to the lower A pillar connecting portion, and the B pillar is connected to the B pillar connecting portion.

6. An automobile member of a closed cross section including an inner panel having a top plate and two side walls connected to the top plate, an outer panel having a top plate and two side walls connected to the top plate, and joint portions in which edge portions of the two side walls of the inner panel are respectively joined to edge portions of the two side walls of the outer panel, the automobile member comprising:

a first region extending rearward from a front end portion of the automobile member;
a first transition region extending rearward continuously with the first region; and
a second region extending rearward continuously with the first transition region,
wherein:
when the height of the side walls of the outer panel in the first region is defined as a first region outer height $ho_1$; the height of the side walls of the inner panel in the first region is defined as a first region inner height $hi_1$; the height of the side walls of the outer panel in the second region is defined as a second region outer height $ho_2$; the height of the side walls of the inner panel in the second region is defined as a second region inner height $hi_2$; the height of the side walls of the outer panel in the first transition region is defined as a first transition region outer height $ho_{1-2}$; and the height of the side walls of the inner panel in the first transition region is defined as a first transition region inner height $hi_{1-2}$,
in the first region, the first region outer height $ho_1$ and the first region inner height $hi_1$ have constant values, and a difference between the first region outer height $ho_1$ and the first region inner height $hi_1$ is smaller than a difference between the second region outer height $ho_2$ and the second region inner height $hi_2$,
in the second region, the second region outer height $ho_2$ has a constant value larger than the second region inner height $hi_2$, or the second region outer height $ho_2$ has a constant value smaller than the second region inner height $hi_2$,
in the first transition region, the first transition region outer height $ho_{1-2}$ continuously varies between the first region outer height $ho_1$ and the second region outer height $ho_2$, and the first transition region inner height $hi_{1-2}$ continuously varies between the first region inner height $hi_1$ and the second region inner height $hi_2$,
the automobile member is a skeleton member of an automobile vehicle body, and
the inner panel is a frontside member inner panel, the outer panel is a frontside member outer panel, and the skeleton member is a frontside member.

7. The automobile member according to claim 6, wherein the following Relational Expression (a) is satisfied in the first region, $$0.40 \times (hi_1 + ho_1) \leq ho_1 < 0.60 \times (hi_1 + ho_1) \quad (a).$$

8. The automobile member according to claim 6, wherein the first region is a region between the front end portion and a position that is 400 mm or less apart rearward from the front end portion.

9. The automobile member according to claim 6, wherein the second region is a region that is present behind a position that is 150 mm or more apart from the front end portion.

10. The automobile member according to claim 6, wherein the following Relational Expression (d) or the following Relational Expression (e) is satisfied in the second region, $$0 \leq hi_2 \leq 0.40 \times (hi_2 + ho_2) \quad (d)$$

$$0 \leq ho_2 < 0.40 \times (hi_2 + ho_2) \quad (e).$$

11. The automobile member according to claim 1, wherein, in at least portions of the joint portions, the edge portions are flanges that are connected so as to be formed in the two side walls of each of the inner panel and the outer panel.

12. The automobile member according to claim 11, wherein in at least portions of the joint portions, the flanges formed in the inner panel are subjected to hemming working so as to cover the flanges formed in the outer panel, or the flanges formed in the outer panel are subjected to hemming working so as to cover the flanges formed in the inner panel.

13. The automobile member according to claim 1, wherein in at least portions of the joint portion, edge portions of the two side walls of the inner panel are respectively overlapped on and joined to edge portions of the two side walls of the outer panel.

14. The automobile member according to claim 1, wherein the joining is performed using resistance spot welding.

15. The automobile member according to claim 1, wherein when the tensile strength of the outer panel is defined as TSo (MPa), the plate thickness of the outer panel is defined as to (mm), the tensile strength of the inner panel is defined as TSi (MPa), and the plate thickness of the inner panel is defined as ti (mm),
the following Relational Expression (f) is satisfied in a case where the second region outer height $ho_2$ is larger than the second region inner height $hi_2$, and
the following Relational Expression (g) is satisfied in a case where the second region outer height $ho_2$ is smaller than the second region inner height $hi_2$, $$TSo \times to < TSi \times ti \quad (f)$$

$$TSo \times to > TSi \times ti \quad (g).$$

16. An automobile member of a closed cross section including an inner panel having a top plate and two side walls connected to the top plate, and an outer panel having a top plate and two side walls connected to the top plate, and joint portions in which edge portions of the two side walls of the inner panel are respectively joined to edge portions of the two side walls of the outer panel,
wherein when the tensile strength of the outer panel is defined as TSo (MPa), the plate thickness of the outer panel is defined as to (mm), the tensile strength of the inner panel is defined as TSi (MPa), and the plate thickness of the inner panel is defined as ti (mm), the height of the side walls of the outer panel is defined as outer height ho, and the height of the side walls of the inner panel is defined is defined as inner height hi,
the outer height ho and the inner height hi have constant values, respectively, in a length direction of the automobile member,
the following Relational Expression (f) is satisfied in a case where the outer height ho is larger than the inner height hi, and
the following Relational Expression (g) is satisfied in a case where the outer height ho is smaller than the inner height hi, $$TSo \times to < TSi \times ti \quad (f)$$

$$TSo \times to > TSi \times ti \quad (g).$$

17. The automobile member according to claim 16, wherein the automobile member is a side sill, and wherein the side sill has a side sill inner panel as the inner panel and has a side sill outer panel as the outer panel.

18. The automobile member according to claim 16, wherein the automobile member is a frontside member, and wherein the frontside member has a frontside member outer panel as the outer panel and has a frontside member inner panel as the inner panel.

19. The automobile member according to claim 1, wherein the automobile member is formed by a tailored welding blank, a tailored rolled blank, or combinations of these materials.

20. The automobile member according to claim 16, wherein the automobile member is formed by a tailored welding blank, a tailored rolled blank, or combinations of these materials.

* * * * *

UNITED STATES PATENT AND TRADEMARK OFFICE
CERTIFICATE OF CORRECTION

PATENT NO. : 10,196,091 B2
APPLICATION NO. : 15/502114
DATED : February 5, 2019
INVENTOR(S) : Kenichiro Otsuka et al.

Page 1 of 1

It is certified that error appears in the above-identified patent and that said Letters Patent is hereby corrected as shown below:

In the Claims

In Claim 1, at Column 25, Line 62: change "the first region inner height hit" to --the first region inner height $hi_1$--

In Claim 3, at Column 26, Line 43: change "the second region outer height hoe" to --the second region outer height $ho_2$--

In Claim 3, at Column 26, Line 47: change "the second region outer height hoe" to --the second region outer height $ho_2$--

In Claim 6, at Column 27, Line 22: change "the first region inner height $hi_t$" to --the first region inner height $hi_1$--

In Claim 6, at Column 27, Line 34: change "the first region outer height hot" to --the first region outer height $ho_1$--

Signed and Sealed this
Thirtieth Day of July, 2019

Andrei Iancu
*Director of the United States Patent and Trademark Office*